(12) United States Patent
Zhou

(10) Patent No.: US 10,516,783 B2
(45) Date of Patent: Dec. 24, 2019

(54) METHOD AND DEVICE FOR PROCESSING PCC RULE

(71) Applicant: ZTE CORPORATION, Shenzhen (CN)

(72) Inventor: Xiaoyun Zhou, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/776,146

(22) PCT Filed: Nov. 17, 2016

(86) PCT No.: PCT/CN2016/106272
§ 371 (c)(1),
(2) Date: May 15, 2018

(87) PCT Pub. No.: WO2017/084603
PCT Pub. Date: May 26, 2017

(65) Prior Publication Data
US 2019/0089843 A1    Mar. 21, 2019

(30) Foreign Application Priority Data

Nov. 19, 2015 (CN) .......................... 2015 1 0811076
Jan. 29, 2016 (CN) .......................... 2016 1 0064136

(51) Int. Cl.
*H04L 12/14* (2006.01)
*H04M 15/00* (2006.01)
(Continued)

(52) U.S. Cl.
CPC ........ *H04M 15/66* (2013.01); *H04L 12/1407* (2013.01); *H04L 45/38* (2013.01);
(Continued)

(58) Field of Classification Search
None
See application file for complete search history.

(56) References Cited

U.S. PATENT DOCUMENTS

2011/0022722 A1* 1/2011 Castellanos Zamora ....................
H04L 12/14
709/235
2011/0202485 A1* 8/2011 Cutler ..................... H04L 12/14
706/12
(Continued)

FOREIGN PATENT DOCUMENTS

CA        2687503 A1    12/2008
CN        1296684 A      5/2001
(Continued)

OTHER PUBLICATIONS

International Search Report in international application No. PCT/CN2016/106272, dated Jan. 24, 2017, 2 pgs.
(Continued)

*Primary Examiner* — German Viana Di Prisco
(74) *Attorney, Agent, or Firm* — McDonald Hopkins LLC

(57) ABSTRACT

Provided herein are a method and device for processing a PCC rule. The method comprises: receiving first internet protocol (IP) stream mapping information transmitted by a UE and used for requesting the processing of an IP stream; determining, on the basis of the first IP stream mapping information, first routing rule information comprising a first PCC rule identification of a first PCC rule corresponding to the IP stream or first filter identifier of a first filter corresponding to the IP stream, where the first filter is a filter that the first PCC rule comprises; transmitting the first routing rule information to a policy and charging rules function entity (PCRF), thus instructing the PCRF to process the first PCC rule according to the first routing rule information.

16 Claims, 15 Drawing Sheets

(51) Int. Cl.
  *H04L 12/721* (2013.01)
  *H04L 12/813* (2013.01)
  *H04W 40/28* (2009.01)
  *H04L 12/851* (2013.01)
  *H04W 28/10* (2009.01)

(52) U.S. Cl.
  CPC .......... *H04L 47/20* (2013.01); *H04L 47/2483* (2013.01); *H04W 40/28* (2013.01); *H04W 28/10* (2013.01)

(56) References Cited

U.S. PATENT DOCUMENTS

| | | | | |
|---|---|---|---|---|
| 2013/0223290 | A1* | 8/2013 | Zhou | H04L 12/1407 370/259 |
| 2014/0211616 | A1* | 7/2014 | Salot | H04W 28/0289 370/230 |
| 2014/0334303 | A1* | 11/2014 | Ma | H04W 28/0268 370/235 |
| 2015/0382393 | A1* | 12/2015 | Kiss | H04W 76/16 370/328 |
| 2016/0135222 | A1* | 5/2016 | Jain | H04W 74/04 370/329 |
| 2017/0026824 | A1* | 1/2017 | Kim | H04W 8/08 |
| 2017/0134986 | A1* | 5/2017 | Jeong | H04W 28/10 |
| 2017/0310584 | A1* | 10/2017 | Kim | H04W 28/02 |
| 2017/0339614 | A1* | 11/2017 | Kim | H04W 8/20 |
| 2018/0014346 | A1* | 1/2018 | Gupta | H04W 76/16 |
| 2018/0249373 | A1* | 8/2018 | Castro Castro | H04L 5/0064 |
| 2018/0324087 | A1* | 11/2018 | Li | H04W 8/12 |
| 2019/0014529 | A1* | 1/2019 | Karampatsis | H04W 40/36 |

FOREIGN PATENT DOCUMENTS

| | | |
|---|---|---|
| CN | 101019379 A | 8/2007 |
| CN | 101022384 A | 8/2007 |
| CN | 101222413 A | 7/2008 |
| CN | 103037449 A | 4/2013 |
| TW | 200838172 A | 9/2008 |
| WO | 2011091683 A1 | 8/2011 |

OTHER PUBLICATIONS

English Translation of the Written Opinion of the International Search Authority in international application No. PCT/CN2016/106272, dated Jan. 24, 2017, 6 pgs.

* cited by examiner

METHOD AND DEVICE FOR PROCESSING PCC RULE

TECHNICAL FIELD

The disclosure relates to the field of communications, and in particular to a method and apparatus for processing a Policy and Charging Control (PCC) rule.

BACKGROUND

A 3rd Generation Partnership Project (3GPP) Evolved Packet System (EPS) is composed of an Evolved Universal Terrestrial Radio Access Network (E-UTRAN), a Mobility Management Entity (MME), a Serving Gateway (S-GW), a Packet Data Network Gateway (P-GW or PDN GW), a Home Subscriber Server (HSS), a 3GPP Authentication, Authorization and Accounting (AAA) server, a Policy and Charging Rules Function (PCRF) entity, and other supporting nodes.

FIG. 1 is a schematic diagram of a system architecture of an EPS in the related art. As shown in FIG. 1, the MME is responsible for related work of a control plane such as mobility management, non-access layer signaling processing, and user mobility management context management; the S-GW is an access gateway device connected to the E-UTRAN, forwards data between the E-UTRAN and the P-GW, and is responsible for caching paging waiting data; the P-GW is a border gateway of an EPS and a Packet Data Network (PDN), which is responsible for PDN access and data forwarding between the EPS and the PDN; and the PCRF is a policy and charging rules function entity, is connected to an operator Internet Protocol (IP) service network through a receiving interface Rx, and acquires service information. In addition, it is connected to a gateway device in the network through a Gx/Gxa/Gxc interface, and is responsible for initiating the establishment of an IP bearer, guaranteeing the Quality of Service (QoS) of service data, and performing charge control.

The EPS supports interworking with non-3GPP systems, where interworking with non-3GPP systems is implemented through S2a/b/c interfaces, and the P-GW serves as an anchor between the 3GPP and non-3GPP systems. In a system architecture diagram of the EPS, non-3GPP systems are divided into trusted non-3GPP IP access and untrusted non-3GPP IP access. The trusted non-3GPP IP access may be directly connected to the P-GW through the S2a interface (a trusted Access GateWay (AG or AGW) exists in the trusted non-3GPP access system, and the AGW and the P-GW are connected through the S2a interface); untrusted non-3GPP IP access requires a connection between an Evolved Packet Data Gateway (ePDG) and the P-GW, an interface between the ePDG and the P-GW is S2b, and S2c provides related control and mobility support of a user plane between a User Equipment (UE) and the P-GW, a supported mobility management protocol being Mobile IPv6 Support for Dual Stack Hosts and Routers (DSMIPv6).

In the EPS system, a Policy and Charging Enforcement Function (PCEF) entity exists in the P-GW, and a Gx interface (see FIG. 1) between the PCRF and the P-GW exchanges information. When the interface between the P-GW and the S-GW is based on Proxy Mobile IPv6 (PMIPv6), the S-GW also has a Bearer Binding and Event Report Function (BBERF) entity to perform QoS control on an IP flow, and the S-GW and the PCRF exchange information through a Gxc interface (see FIG. 1). When a trusted non-3GPP access system accesses, the BBERF also resides in a trusted non-3GPP access gateway. The trusted non-3GPP access gateway exchanges information with the PCRF through a Gxa interface (see FIG. 1). When the UE roams, an S9 interface serves as an interface between a home PCRF and a visitor PCRF, and also provides an Application Function (AF) of the service for the UE. Service information for making a Policy and Charging Control (PCC) policy is sent to the PCRF through the Rx interface. In 3GPP, the corresponding PDN may be found through an Access Point Name (APN). One connection from the UE to the PDN network is usually referred to as an IP Connectivity Access Network (IP-CAN) session. During the setup of the IP-CAN session, the BBERF and the PCEF set up a Diameter session with the PCRF respectively, and through these Diameter sessions, policy and charging information for controlling the IP-CAN session and information for making a policy are transmitted.

The EPS supports a UE to simultaneously access one PDN through multiple access networks, namely Multiple Access. FIG. 2 is a schematic diagram of a multi-access scenario in the related art. As shown in FIG. 2, a UE is simultaneously covered by non-3GPP and 3GPP access to access a PDN through the same P-GW by means of a non-3GPP IP access network and a 3GPP IP access network.

FIG. 3 is a flowchart of setting up a Multiple Access IP-CAN session in the related art. As shown in FIG. 3, after a UE is within a dual coverage range of a 3GPP access network and a trusted non-3GPP access network, the UE establishes a connection to a default PDN through the 3GPP access network and the trusted non-3GPP access network simultaneously. The specific steps are described as follows.

In step S301, a UE sends an attach request message to an MME by carrying a Network Access Identifier (NAI), an APN, a network-based IP flow migration NBIFOM support, and an NBIFOM mode.

In step S302, the MME initiates an authentication flow for the UE, and authentication related information is exchanged between the MME and the HSS as needed. After the authentication succeeds, the MME initiates a location update flow, and an HSS sends subscription data of the UE to the MME. In the authentication process, the HSS sends P-GW selection information to the MME, including a default APN. The MME selects a P-GW according to the APN, and the MME selects an S-GW, the NBIFOM support, and the NBIFOM mode.

In step S303, the MME sends a create session request message to the S-GW, wherein a default bearer setup request message carries the NAI, the APN, an IP address of the selected P-GW, the NBIFOM support, and the NBIFOM mode.

In step S304, the S-GW sends a create session request message to the P-GW, wherein the request message carries the NAI, the APN, the NBIFOM support, and the NBIFOM mode.

In step S305, a PCEF residing on the P-GW sends an "IP-CAN session setup indication" message to a PCRF, wherein the "IP-CAN session setup indication" message carries the NAI, the APN, an IP address located by the P-GW to the UE, the NBIFOM support, and the NBIFOM mode. The PCRF acquires subscription information of the UE to make a policy decision, including whether to support the NBIFOM and the NBIFOM mode.

In step S306, the PCRF returns an "IP-CAN session setup confirmation" message to the P-GW, wherein the "IP-CAN session setup confirmation" message carries corresponding PCC rules and event triggers, as well as the NBIFOM support and the NBIFOM mode. The PCEF installs the PCC rules and the event triggers.

In step S307, the P-GW returns a create session response message to the S-GW, wherein the message carries the IP address allocated by the P-GW for the UE, the NBIFOM support, and the NBIFOM mode.

In step S308, the S-GW returns a create session confirmation message to the MME, wherein the confirmation message carries the IP address of the UE, the NBIFOM support, and the NBIFOM mode.

In step S309, the MME, the eNodeB, and the UE interact to establish a radio bearer, and the UE acquires the NBIFOM support and the NBIFOM mode.

In step S310, after the radio bearer is established, the MME sends an update bearer request to the S-GW to notify the eNodeB of address information and the like, and the S-GW returns a response message.

In step S311, the UE performs a specific non-3GPP access process and accesses a trusted non-3GPP access network.

In step S312, after accessing the trusted non-3GPP access network, the UE requests an HSS/AAA to perform EPS access authentication; after receiving the EPS access authentication request, the HSS/AAA authenticates the UE that sends the request; and after completing the authentication of the UE, the HSS/AAA sends, back to a trusted non-3GPP access gateway, the P-GW selected in the 3GPP access and the APN contracted by the UE, including the default APN.

In step S313, after the authentication is successful, a layer-3 attach flow is triggered, and a message sent from the UE to the trusted access gateway carries a handover indicator, the NBIFOM support, and an NBIFOM Default access.

In step S314, the trusted non-3GPP access gateway selects the same P-GW according to the handover indicator, and sends a create session request message to the P-GW, where the request message carries NAI, APN, handover indication, NBIFOM support, and NBIFOM. Default access;

Step S315, the PCEF resident in the P-GW sends an "IP-CAN session modification indication" message to the PCRF, wherein the "IP-CAN session modification indication" message carries NBIFOM support, NBIFOM default access;

In step S316, the PCRF makes a decision to confirm support of the NBIFOM and the NBIFOM default access. The PCRF returns an "IP-CAN session modification confirmation" message to the P-GW, wherein the "IP-CAN session modification confirmation" message carries the NBIFOM support and the NBIFOM default access.

In step S317, the P-GW saves its own IP address and other information to the HSS, and registers multiple accesses in the HSS.

In step S318, the P-GW is maintained to two tunnels of the S-GW and the trusted non-3GPP access gateway according to the NBIFOM support simultaneously; and the P-GW returns a create session request message to the trusted non-3GPP access gateway, wherein the message carries the IP address allocated by the P-GW for the UE, the NBIFOM support, and the NBIFOM default access.

In step S319, the trusted non-3GPP access gateway returns a response message to the UE, wherein the response message carries the IP address of the UE, the NBIFOM support, and the NBIFOM default access.

Through the above flow, the PCRF performs policy and charging control through IP-CAN sessions of 3GPP access and non-3GPP access simultaneously. The UE obtained the NBIFOM mode and default access.

In this scenario, the P-GW allocates an IP address for the UE, that is, there is only one IP-CAN session between the UE and the PDN. The P-GW or the PCRF determines an access network through which an IP data flow is sent to the UE according to different characteristics of the service. For example, when the non-3GPP access network is WiFi, the IP flows of Http and Ftp may access the network through the WiFi, and meanwhile, the IP flow of VoIP may be sent to the UE through 3GPP. In this way, services with lower real-time requirements, such as Http and Ftp, may take advantage of lower WiFi charges, while services with higher real-time requirements such as VoIP may take advantages of 3GPP QoS control and better mobility management.

If the NBIFOM mode determined by a negotiation between the UE and the network is a Network-initiated mode, a network-initiated flow migration mode will be supported. As shown in FIG. 4, FIG. 4 is a flowchart of a network-initiated flow migration in the related art. The specific steps are as follows.

In step S401, a PCRF determines to initiate a flow migration upon receiving a trigger. The trigger includes: receiving, by the PCRF, new service request information from an AF, making a PCC policy and determining an access network for new service transmission. Or, the PCRF needs to adjust an access network for the ongoing service transmission because of a network load, a contract change or a network policy change.

In step S402, the PCRF provides a message through a policy and charging rule to send a PCC rule 1 and an allowed access network type to a PCEF. The allowed access network type indicates that when the PCEF detects service data flows identified by the PCC rule 1, these service data flows are sent to an access network indicated by the allowed access network type. The PCC rule 1 carries a PCC rule identifier (i.e., PCC rule identifier 1) and a service data flow template, wherein one or more service data flow filters may be included.

In step S403, the PCEF installs the PCC rule 1 and associates the PCC rule 1 with the corresponding access network connection according to the allowed access network type. In addition, the PCEF extracts an NBIFOM routing rule 1 according to the received information. The NBIFOM routing rule 1 also includes information such as an NBIFOM routing rule identifier (i.e., routing rule identifier 1), a packet filter in the PCC rule 1, and the allowed access network type. If a service filter template in the PCC rule 1 includes multiple packet filters, the PCEF extracts multiple NBIFOM routing rules.

In step S404, the PCEF sends the NBIFOM routing rule 1 to the UE by using an existing flow.

In step S405, the PCEF returns a response message to the PCRF.

The conventional art also supports a flow for a UE to request a network to make or change a flow migration policy. FIG. 5 is a flowchart of a UE requesting IP flow mapping in the related art. As shown in FIG. 5, the method includes the following steps.

In step S501, a UE determines to initiate an IP flow mapping request flow upon receiving a trigger. The trigger may include: the UE may determine to initiate a new service and hope that the service will not be transmitted on a default access or the UE determines to change an access network for the ongoing service transmission because of a network load, a network policy, etc.

In step S502, the UE initiates an IP flow mapping request flow in the conventional art. A request message carries IP flow mapping information, and the information carries a packet filter, a requested access network type, and a requested operation type. The requested operation type includes addition (that is, adding a Packet filter), modification (that is, modifying an existing packet filter or modifying an allowed access network type) or deletion (that is, deleting an existing packet filter, i.e., deleting a certain NBIFOM routing rule).

In step S503, a P-GW extracts an NBIFOM routing rule2 according to the IP flow mapping information. The NBIFOM routing rule2 carries information in the IP flow mapping information. The P-GW may allocate a new routing rule identifier (routing rule identifier 2).

In step S504, a PCEF residing in the P-GW sends a policy and charging rule request message to a PCRF. The message carries the NBIFOM routing rule2 and an operation type of the NBIFOM routing rule2.

In step S505, the PCRF makes a policy decision. For the addition operation, the PCRF makes a new PCC rule (PCC rule 2). For the modification operation, the PCRF modifies the original PCC rule. In addition, the PCRF determines a corresponding allowed access network type according to a requested access network type. For the deletion operation, the PCRF Delete the original PCC rule.

In step S506, the PCRF returns a confirmation message. For the addition or modification operation, the message carries a newly-made PCC rule 2 or an updated PCC rule 1 and an allowed access network type.

In step S507, the PCEF extracts the NBIFOM routing rule according to the received information. If the operation is the addition operation, the PCEF makes a new NBIFOM routing rule according to the received information. If the operation is the modification operation, the PCEF updates the original NBIFOM routing rule according to the received information.

In step S508, the PCEF residing in the P-GW returns a response to the UE, carrying the NBIFOM routing rule. If it is the deletion operation, the PCEF only returns a response message and does not carry the NBIFOM routing rule.

In the flow shown in FIG. 4, the PCRF instructs an IP flow transmission access network through the made PCC rule and allow access type, and the PCEF extracts the NBIFOM routing rule according to the information received from the PCRF. In the flow shown in FIG. 5, the UE requests to modify the NBIFOM routing rule received from the network. The PCEF receives the request of the UE and sends a request to the PCRF to modify the NBIFOM routing rule. Then, there is no information about the NBIFOM routing rule before the PCRF. Thus, in fact, the PCRF does not know what information the PCRF modifies, so the PCRF cannot make a correct decision. As a result, the above flow cannot be performed.

To solve the problem in the related art that a PCRF is unable to modify a PCC rule, no effective solution has been proposed yet.

SUMMARY

The disclosure provides a method and apparatus for processing a PCC rule, intended to at least solve the problem in the related art that a PCRF is unable to modify a PCC rule.

According to an aspect of the disclosure, a method for processing a PCC rule is provided. The method includes: receiving first IP flow mapping information sent from a UE and used for requesting to process an IP flow; determining, according to the first IP flow mapping information, first routing rule information including a first PCC rule identifier of a first PCC rule corresponding to the IP flow or first filter identifier of a first filter corresponding to the IP flow, wherein the first filter is a filter included in the first PCC rule; and sending the first routing rule information to a PCRF, so as to instruct the PCRF to process the first PCC rule according to the first routing rule information.

According to an aspect, when the first IP flow mapping information is used for requesting to modify an allowed access network type of the IP flow, the first IP flow mapping information carries identification information of a second routing rule and a requested access network type corresponding to the IP flow, and determining first routing rule information of the IP flow according to the first IP flow mapping information includes: determining the first PCC rule identifier or the first filter identifier according to the identification information of the second routing rule, wherein the first routing rule information further includes the requested access network type.

According to an aspect, when the first routing rule information includes the first PCC rule identifier and the first PCC rule includes two or more filters, the first routing rule information further carries the first filter.

According to an aspect, processing, by the PCRF, the first PCC rule according to the first routing rule information includes: when the first PCC rule only includes the first filter, updating, by the PCRF, an allowed access network type corresponding to the first PCC rule, with the requested access network type; or, when the first PCC rule includes two or more filters, deleting, by the PCRF, the first filter from a service filter template of the first PCC rule, and generating the second PCC rule according to the first filter, wherein an allowed access network type corresponding to the second PCC rule is the requested access network type.

According to an aspect, when the first IP flow mapping information is used for requesting to delete a second routing rule corresponding to the IP flow, the first IP flow mapping information carries identification information of the second routing rule and information indicating that a requested processing type is deletion, and determining first routing rule information of the IP flow according to the first IP flow mapping information includes: determining the first PCC rule identifier or the first filter identifier according to the identification information of the second routing rule, wherein the first routing rule information further includes information indicating that the requested processing type is deletion.

According to an aspect, when the first routing rule information includes the first PCC rule identifier and the first PCC rule includes two or more filters, the first routing rule information further carries the first filter.

According to an aspect, processing, by the PCRF, the first PCC rule according to the first routing rule information includes: when the first PCC rule only includes the first filter, deleting, by the PCRF, the first PCC rule; or, when the first PCC rule includes two or more filters, deleting, by the PCRF, the first filter from a service filter template of the first PCC rule.

According to an aspect, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and determining first routing rule information of the IP flow according to the first IP flow mapping information includes: determining the first PCC rule identifier or the first filter identifier according to the identification information of the second routing rule, wherein the second routing rule information further includes the new filter and information indicating that the requested processing type is modification.

According to an aspect, when the first routing rule information includes the first PCC rule identifier and the first PCC rule includes two or more filters, the first routing rule information further carries all filters other than the first filter in the first PCC rule.

According to an aspect, processing, by the PCRF, the first PCC rule according to the first routing rule information includes: replacing, by the PCRF, a service filter template in the first PCC rule with a filter carried in the first routing rule.

According to an aspect, processing, by the PCRF, the first PCC rule according to the first routing rule includes: replacing, by the PCRF, a filter corresponding to the first filter identifier in a filter template in the first PCC rule with the new filter.

According to an aspect, when determining, according to the first IP flow mapping information, first routing rule information including first filter identifier of a first filter corresponding to the IP flow, before receiving the first IP flow mapping information sent from the UE and used for requesting to process the IP flow, the method further includes: determining a filter identifier or a routing rule identifier allocated by the PCRF for a filter included in the first PCC rule.

According to an aspect, the first filter identifier is carried in a filter identification Attribute Value Pair (AVP) or a routing rule identification AVP.

According to another aspect of the disclosure, a method for processing a PCC rule is provided. The method includes: receiving first routing rule information that is sent from a PCEF and includes a first PCC rule identifier of a first PCC rule corresponding to an IP flow or first filter identifier of a first filter corresponding to the IP flow, wherein the first routing rule information is determined by the PCEF according to first IP flow mapping information sent from a UE and used for requesting to process the IP flow, and the first filter is a filter included in the first PCC rule; and processing the first PCC rule according to the first routing rule information.

According to an aspect, when the first IP flow mapping information is used for requesting to modify an allowed access network type of the IP flow, the first IP flow mapping information carries identification information of a second routing rule and a requested access network type corresponding to the IP flow, and processing the first PCC rule according to the first routing rule information includes: when the first PCC rule only includes the first filter, updating an allowed access network type corresponding to the first PCC rule, with the requested access network type of the UE; or, when the first PCC rule includes two or more filters, deleting the first filter from a service filter template of the first PCC rule, and generating a second PCC rule according to the first filter, wherein an allowed access network type corresponding to the second PCC rule is the requested access network type.

According to an aspect, when the first routing rule information includes the first PCC rule identifier and the first PCC rule includes two or more filters, the first routing rule information further carries the first filter.

According to an aspect, when the first IP flow mapping information is used for requesting to delete a second routing rule corresponding to the IP flow, the first IP flow mapping information carries identification information of the second routing rule and information indicating that a requested processing type is deletion, and processing the first PCC rule according to the first routing rule information includes: when the first PCC rule only includes the first filter, deleting the first PCC rule; or, when the first PCC rule includes two or more filters, deleting the first filter from a service filter template of the first PCC rule.

According to an aspect, when the first routing rule information includes the first PCC rule identifier and the first PCC rule includes two or more filters, the first routing rule information further carries the first filter.

According to an aspect, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and processing the first PCC rule according to the first routing rule information includes: replacing a service filter template in the first PCC rule with a filter carried in the first routing rule; or, replacing a filter corresponding to the first filter identifier in a filter template in the first PCC rule with the new filter.

According to an aspect, when the first routing rule information includes the first PCC rule identifier and the first PCC rule includes two or more filters, the first routing rule information further carries all filters other than the first filter in the first PCC rule.

According to an aspect, when receiving first routing rule information that is sent from a PCEF and includes first filter identifier of a first filter corresponding to the IP flow, before receiving the first IP flow mapping information, the method further includes: allocating a filter identifier or a routing rule identifier for a filter included in the first PCC rule; and notifying the PCEF of the allocated filter identifier or routing rule identifier.

According to an aspect, the first filter identifier is carried in a filter identification AVP or a routing rule identification AVP.

According to another aspect of the disclosure, an apparatus for processing a PCC rule is provided. The apparatus includes: a first receiving module, configured to receive first IP flow mapping information sent from a UE and used for requesting to process an IP flow; a first determination module, configured to determine, according to the first IP flow mapping information, first routing rule information including a first PCC rule identifier of a first PCC rule corresponding to the IP flow or first filter identifier of a first filter corresponding to the IP flow, wherein the first filter is a filter included in the first PCC rule; and a sending module, configured to send the first routing rule information to a PCRF, so as to instruct the PCRF to process the first PCC rule according to the first routing rule information.

According to an aspect, when the first IP flow mapping information is used for requesting to modify an allowed access network type of the IP flow, the first IP flow mapping information carries identification information of a second routing rule and a requested access network type corresponding to the IP flow, and the first determination module includes: a first determination unit, configured to determine the first PCC rule identifier or the first filter identifier according to the identification information of the second routing rule, wherein the first routing rule information further includes the requested access network type.

According to an aspect, when the first routing rule information includes the first PCC rule identifier and the first PCC rule includes two or more filters, the first routing rule information further carries the first filter.

According to an aspect, when the first IP flow mapping information is used for requesting to delete a second routing rule corresponding to the IP flow, the first IP flow mapping information carries identification information of the second routing rule and information indicating that a requested processing type is deletion, and the first determination module includes: a second determination unit, configured to determine the first PCC rule identifier or the first filter identifier according to the identification information of the second routing rule, wherein the first routing rule information further includes information indicating that the requested processing type is deletion.

According to an aspect, when the first routing rule information includes the first PCC rule identifier and the first PCC rule includes two or more filters, the first routing rule information further carries the first filter.

According to an aspect, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and the first determination module includes: a third determination unit, configured to determine the first PCC rule identifier or the first filter identifier according to the identification information of the second routing rule, wherein the first routing rule information further includes the new filter and information indicating that the requested processing type is modification.

According to an aspect, when the first routing rule information includes the first PCC rule identifier and the first PCC rule includes two or more filters, the first routing rule information further carries all filters other than the first filter in the first PCC rule.

According to an aspect, the apparatus further includes: a second determination module, configured to determine a filter identifier or a routing rule identifier allocated by the PCRF for a filter included in the first PCC rule when determining, according to the first IP flow mapping information, first routing rule information including first filter identifier of a first filter corresponding to the IP flow, and before receiving the first IP flow mapping information sent from the UE and used for requesting to process the IP flow.

According to an aspect, the first filter identifier is carried in a filter identification AVP or a routing rule identification AVP.

According to another aspect of the disclosure, an apparatus for processing a PCC rule is also provided. The apparatus includes: a second receiving module, configured to receive first routing rule information that is sent from a PCEF and includes a first PCC rule identifier of a first PCC rule corresponding to an IP flow or first filter identifier of a first filter corresponding to the IP flow, wherein the first routing rule information is determined by the PCEF according to first IP flow mapping information sent from a UE and used for requesting to process the IP flow, and the first filter is a filter included in the first PCC rule; and a processing module, configured to process the first PCC rule according to the first routing rule information.

According to an aspect, when the first IP flow mapping information is used for requesting to modify an allowed access network type of the IP flow, the first IP flow mapping information carries identification information of a second routing rule and a requested access network type corresponding to the IP flow, and the processing module includes: an update unit, configured to update, when the first PCC rule only includes the first filter, an allowed access network type corresponding to the first PCC rule, with the requested access network type of the UE; or, a processing unit, configured to delete, when the first PCC rule includes two or more filters, the first filter from a service filter template of the first PCC rule, and generate a second PCC rule according to the first filter, wherein an allowed access network type corresponding to the second PCC rule is the requested access network type.

According to an aspect, when the first routing rule information includes the first PCC rule identifier and the first PCC rule includes two or more filters, the first routing rule information further carries the first filter.

According to an aspect, when the first IP flow mapping information is used for requesting to delete a second routing rule corresponding to the IP flow, the first IP flow mapping information carries identification information of the second routing rule and information indicating that a requested processing type is deletion, and the processing module includes: a first deletion unit, configured to delete, when the first PCC rule only includes the first filter, the first PCC rule; or, a second deletion unit, configured to delete, when the first PCC rule includes two or more filters, the first filter from a service filter template of the first PCC rule.

According to an aspect, when the first routing rule information includes the first PCC rule identifier and the first PCC rule includes two or more filters, the first routing rule information further carries the first filter.

According to an aspect, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and the processing module includes: a first replacement unit, configured to replace a service filter template in the first PCC rule with a filter carried in the first routing rule; or, a second replacement unit, configured to replace a filter corresponding to the first filter identifier in a filter template in the first PCC rule with the new filter.

According to an aspect, when the first routing rule information includes the first PCC rule identifier and the first PCC rule includes two or more filters, the first routing rule information further carries all filters other than the first filter in the first PCC rule.

According to an aspect, the apparatus further includes: an allocation module, configured to allocate a filter identifier or a routing rule identifier for a filter included in the first PCC rule when receiving first routing rule information that is sent from a PCEF and includes first filter identifier of a first filter corresponding to the IP flow and before receiving the first IP flow mapping information; and a notification module, configured to notify the PCEF of the allocated filter identifier or routing rule identifier.

Another embodiment of the disclosure provides a computer storage medium having an execution instruction stored therein, the execution instruction being used to execute one of the steps in the above method embodiment or the combination thereof.

By means of the disclosure, first IP flow mapping information sent from a UE and used for requesting to process an IP flow is received; according to the first IP flow mapping information, first routing rule information including a first PCC rule identifier of a first PCC rule corresponding to the IP flow or first filter identifier of a first filter corresponding to the IP flow is determined, wherein the first filter is a filter included in the first PCC rule; and the first routing rule information is sent to a PCRF, so as to instruct the PCRF to process the first PCC rule according to the first routing rule information. The problem in the related art that a PCRF is unable to modify a PCC rule is solved, thus achieving the effect of allowing the PCRF to modify the PCC rule.

BRIEF DESCRIPTION OF DRAWINGS

The drawings described herein are provided to provide a further understanding of the disclosure, and constitute a part of the present application. The exemplary embodiments of the disclosure and descriptions thereof are used to explain the disclosure, and do not constitute improper limits to the disclosure. In the drawing.

DETAILED DESCRIPTION

Hereinafter, the disclosure will be described in detail with reference to the accompanying drawings and in conjunction with the embodiments. It should be noted that the embodiments in the present application and the features in the embodiments can be combined with each other without conflict.

It should be noted that the terms "first", "second", and the like in the specification and claims of the disclosure and the foregoing drawings are used to distinguish similar objects and do not necessarily describe a specific sequence or order.

Figure 1:
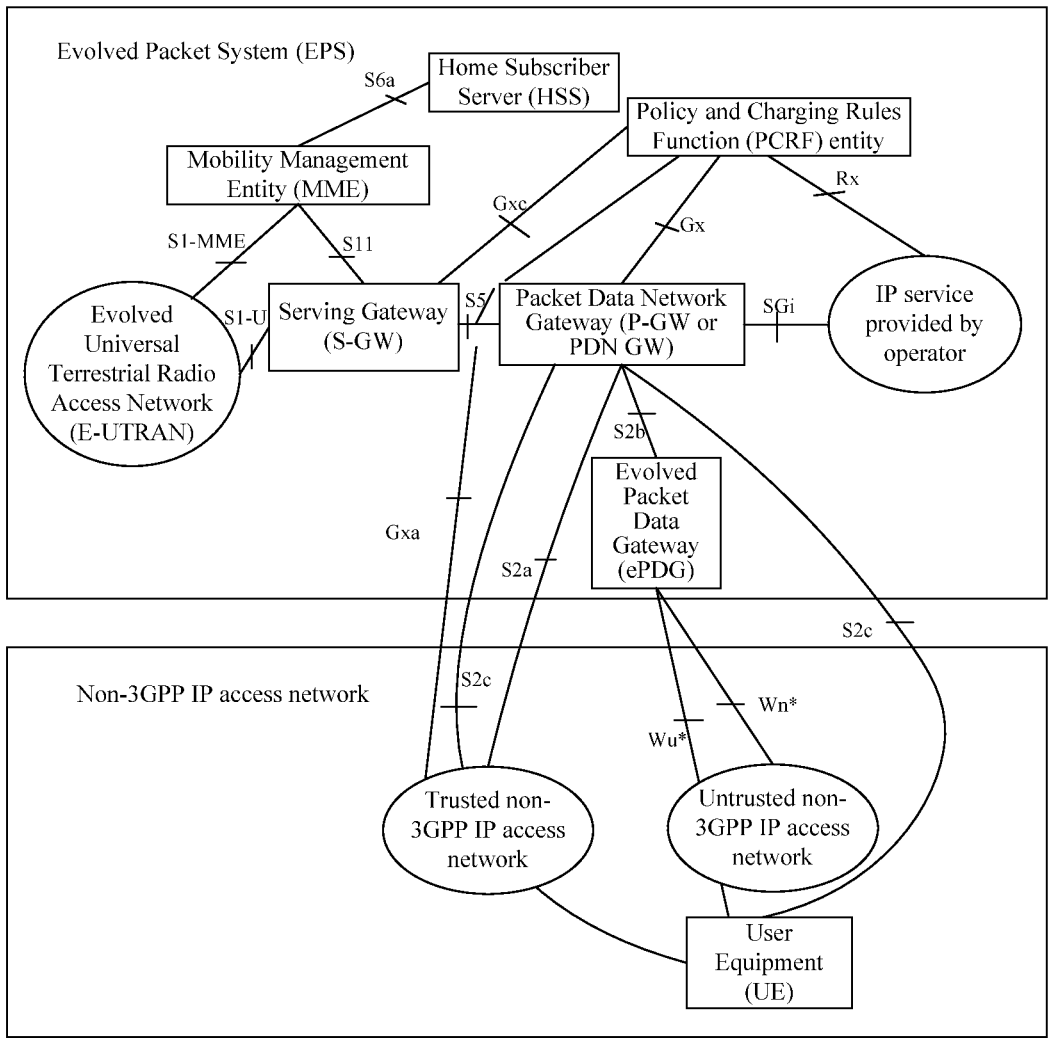
FIG. 1 is a schematic diagram of a system architecture of an EPS in the related art.
Figure 2:
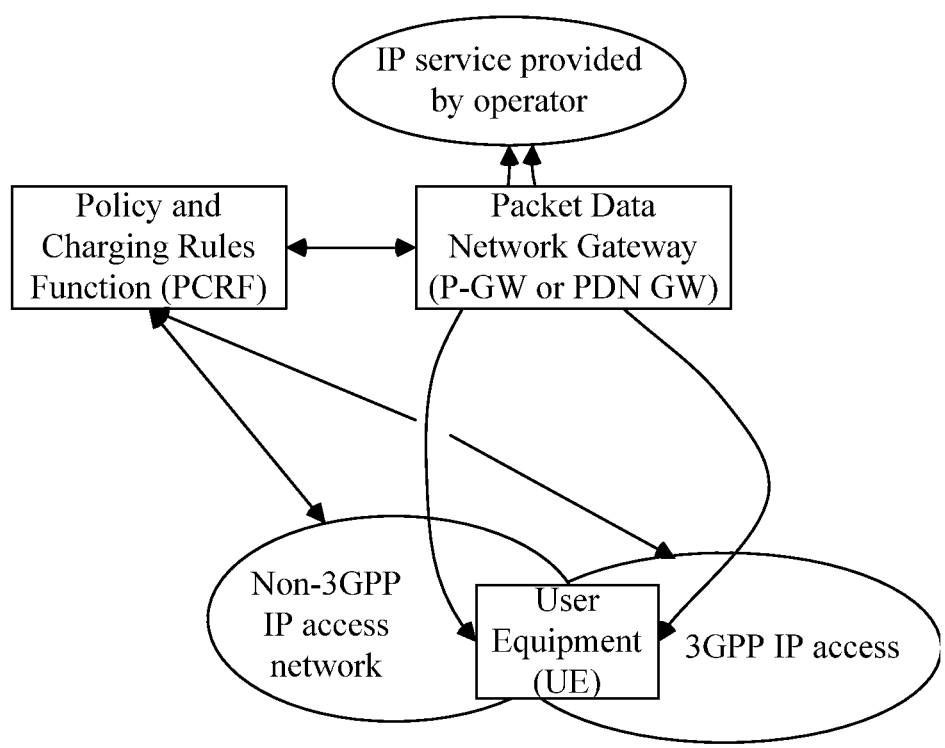
FIG. 2 is a schematic diagram of a multiple access scenario in the related art.
Figure 3:
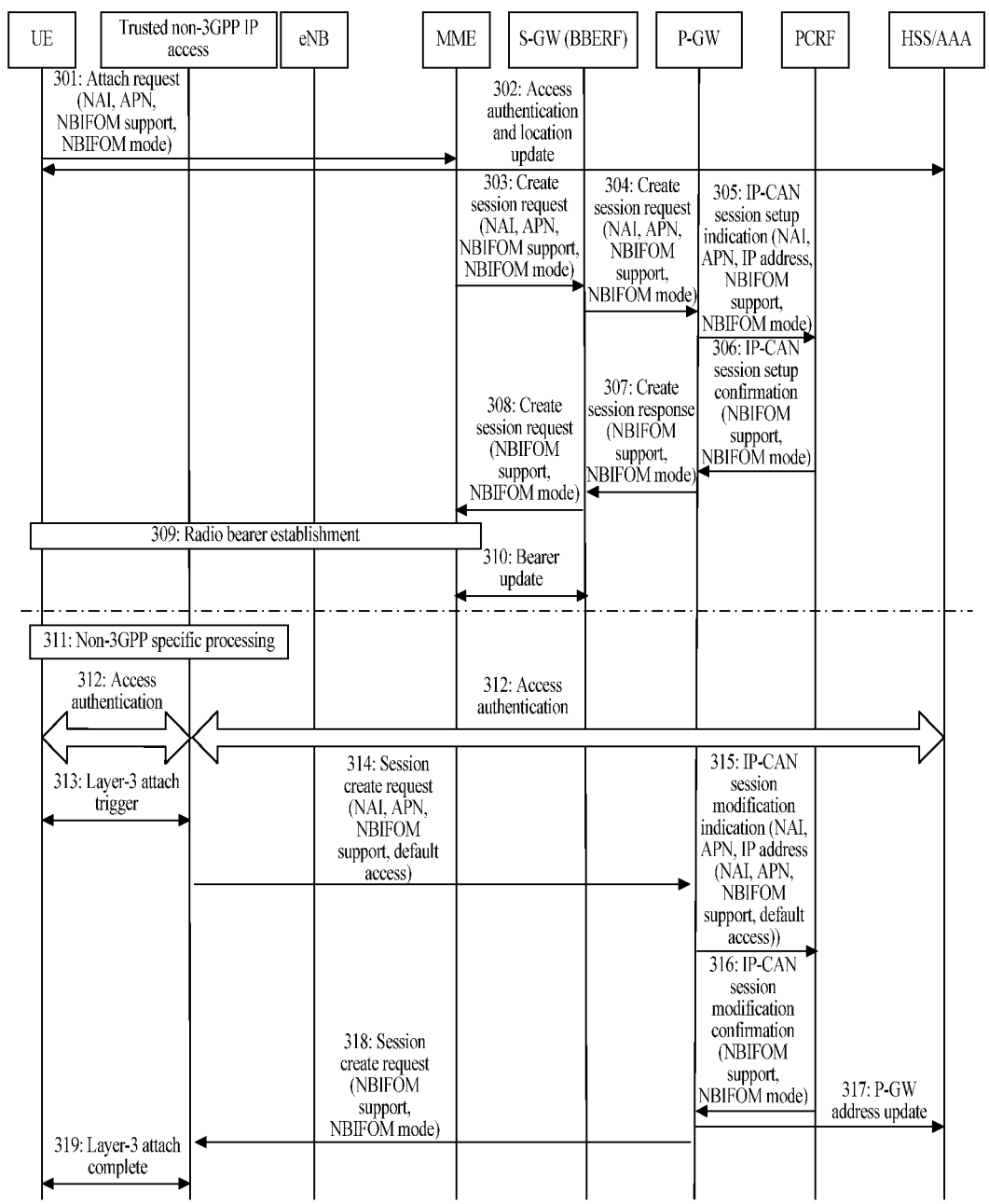
FIG. 3 is a flowchart of setting up a Multiple Access IP-CAN session in the related art.
Figure 4:
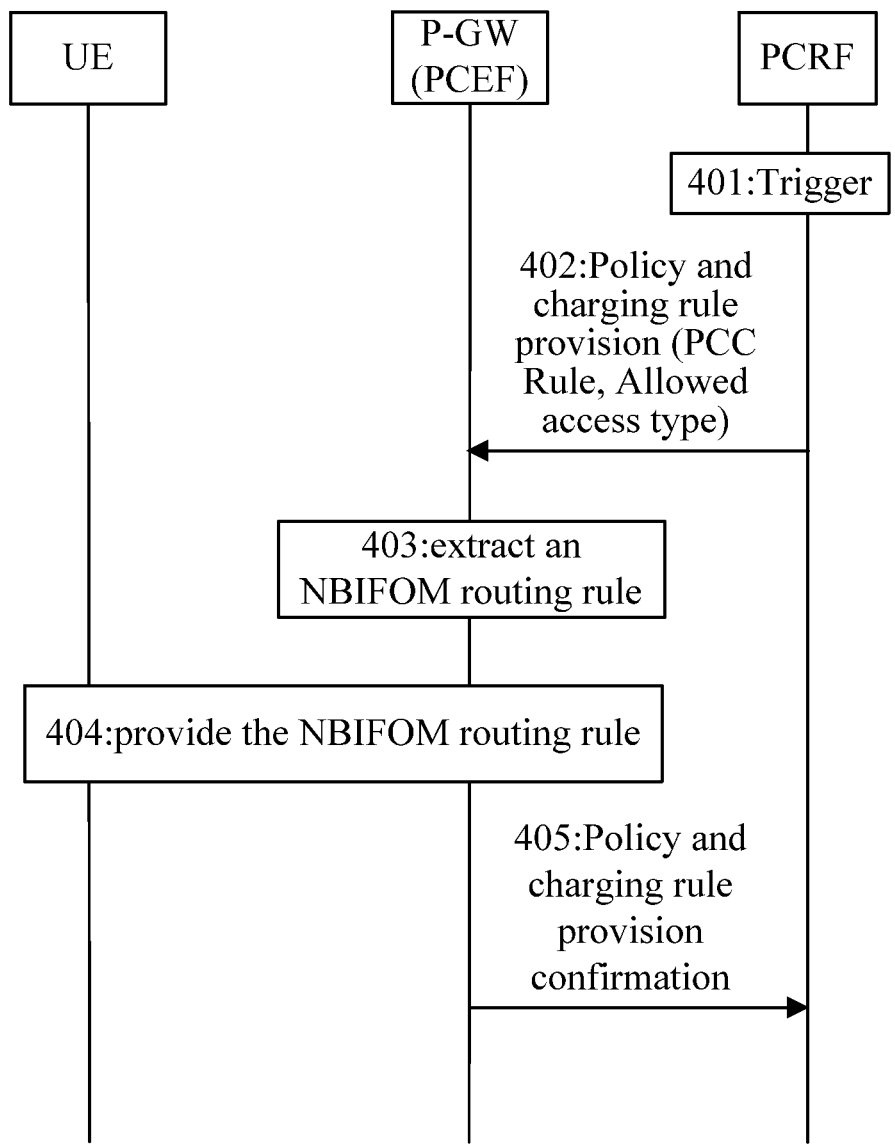
FIG. 4 is a flowchart of a network-initiated flow migration in the related art.
Figure 5:
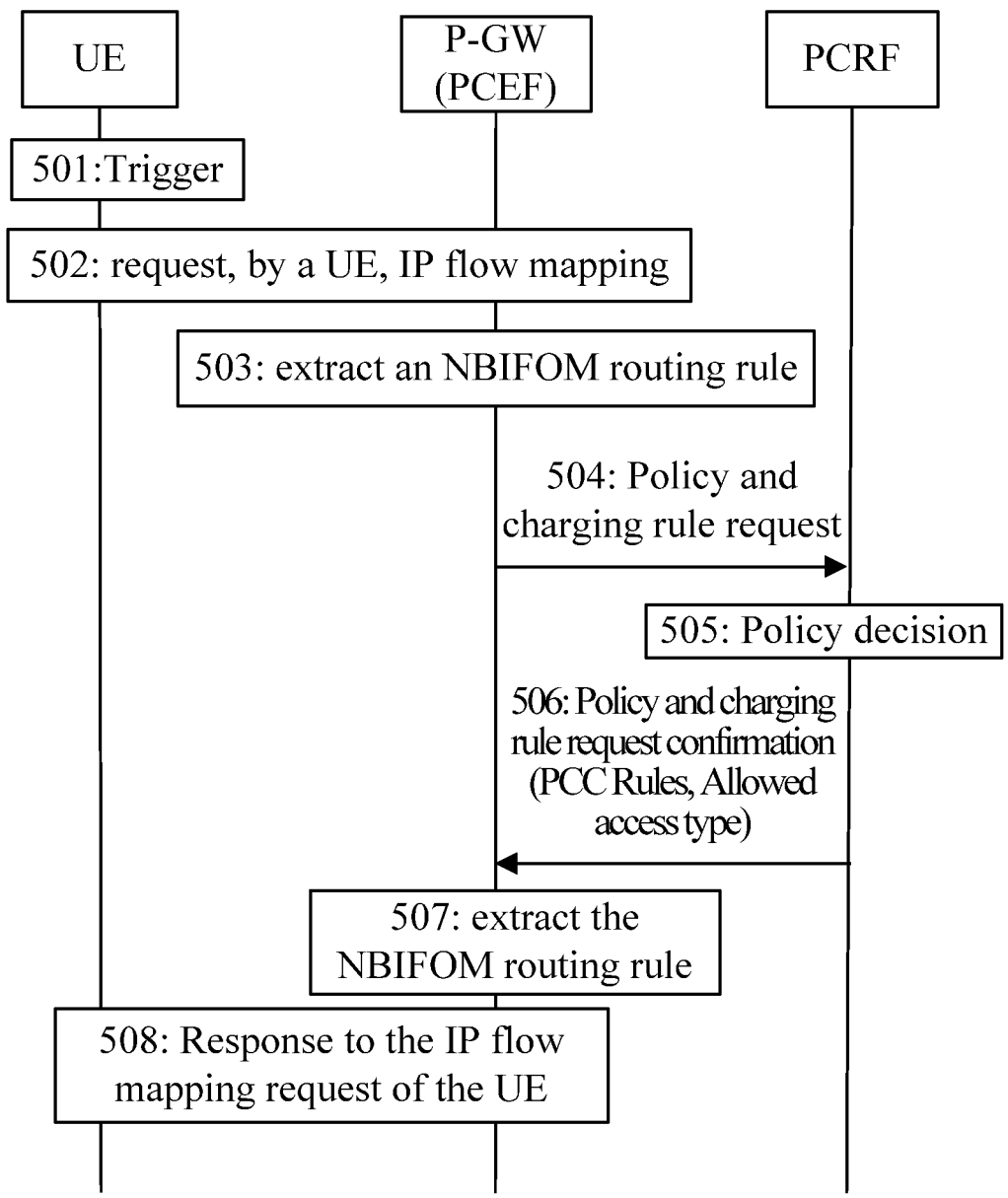
FIG. 5 is a flowchart of a UE requesting IP flow mapping in the related art.
Figure 6:
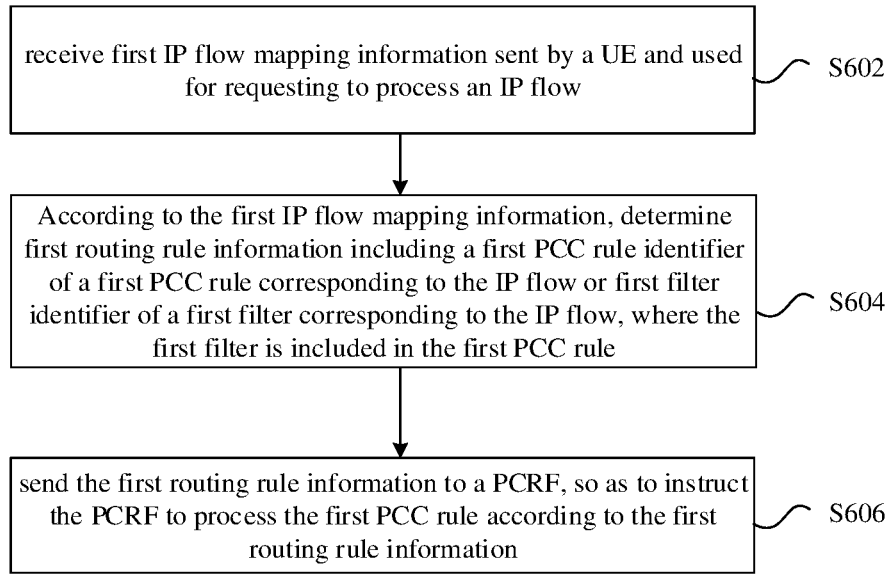
FIG. 6 is a flowchart of a first method for processing a PCC rule according to an embodiment of the disclosure.

In the present embodiment, a method for processing a PCC rule is provided. FIG. 6 is a flowchart of a first method for processing a PCC rule according to an embodiment of the disclosure. As shown in FIG. 6, the flow includes the steps as follows.

In step S602, first IP flow mapping information sent from a UE and used for requesting to process an IP flow is received.

In step S604, according to the first IP flow mapping information, first routing rule information including a first PCC rule identifier of a first PCC rule corresponding to the IP flow or first filter identifier of a first filter corresponding to the IP flow is determined, wherein the first filter is a filter included in the first PCC rule.

In step S606, the first routing rule information is sent to a PCRF, so as to instruct the PCRF to process the first PCC rule according to the first routing rule information.

As can be seen from the above embodiment, the first routing rule information includes a first PCC rule identifier of a first PCC rule corresponding to an IP flow or first filter identifier of a first filter corresponding to an IP flow and included in a first PCC rule. Moreover, a PCEF may perform the above operations. Through the above steps, when the PCEF requests a PCRF to process a first PCC rule, the PCEF informs the PCRF of related identification information. Through the above steps, after the PCRF receives the related identification information, a first PCC rule corresponding to the above identification information or a filter in the first PCC rule may be processed to achieve the purpose of processing a PCC rule by the PCRF.

In an alternative embodiment, when the first IP flow mapping information is used for requesting to modify an allowed access network type of the IP flow, the first IP flow mapping information carries identification information of a second routing rule and a requested access network type corresponding to the IP flow, and the operation that first routing rule information of the IP flow is determined according to the first IP flow mapping information includes: the first PCC rule identifier or the first filter identifier is determined according to the identification information of the second routing rule, wherein the first routing rule information further includes the requested access network type and information indicating that a requested processing type is modification.

The first PCC rule may include a filter, and may also include multiple filters. In an alternative embodiment, when the first routing rule information includes the first PCC rule identifier and the first PCC rule includes two or more filters, the first routing rule information further carries the first filter. The PCRF may thus be made to determine to process a specific filter included in the first PCC rule.

In an alternative embodiment, the operation that the PCRF processes the first PCC rule according to the first routing rule information includes: when the first PCC rule only includes the first filter, the PCRF updates an allowed access network type corresponding to the first PCC rule, with the requested access network type; or, when the first PCC rule includes two or more filters, the PCRF deletes the first filter from a service filter template of the first PCC rule, and generates a second PCC rule according to the first filter, wherein an allowed access network type corresponding to the second PCC rule is the requested access network type.

The first request message may also be used to request other processing. In an alternative embodiment, when the first IP flow mapping information is used for requesting to delete a second routing rule corresponding to the IP flow, the first IP flow mapping information carries identification information of the second routing rule and information indicating that a requested processing type is deletion, and the operation that first routing rule information of the IP flow is determined according to the first IP flow mapping information includes: the first PCC rule identifier or the first filter identifier is determined according to the identification information of the second routing rule, wherein the first routing rule information further includes information indicating that the requested processing type is deletion.

In an alternative embodiment, when the first routing rule information includes the first PCC rule identifier and the first PCC rule includes two or more filters, the first routing rule information further carries the first filter.

In an alternative embodiment, the operation that the PCRF processes the first PCC rule according to the first routing rule information includes: when the first PCC rule only includes the first filter, the PCRF deletes the first PCC rule; or, when the first PCC rule includes two or more filters, the PCRF deletes the first filter from a service filter template of the first PCC rule.

In an alternative embodiment, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and the operation that first routing rule information of the IP flow is determined according to the first IP flow mapping information includes: the first PCC rule identifier or the first filter identifier is determined according to the identification information of the second routing rule, wherein the second routing rule information further includes the new filter and information indicating that the requested processing type is modification.

In an alternative embodiment, when the first routing rule information includes the first PCC rule identifier and the first PCC rule includes two or more filters, the first routing rule information further carries all filters other than the first filter in the first PCC rule.

In an alternative embodiment, the operation that the PCRF processes the first PCC rule according to the first routing rule information includes: the PCRF replaces a service filter template in the first PCC rule with a filter carried in the first routing rule.

In an alternative embodiment, the operation that the PCRF processes the first PCC rule according to the first routing rule includes: the PCRF replaces a filter corresponding to the first filter identifier in a filter template in the first PCC rule with the new filter.

In an alternative embodiment, when determining first routing rule information including first filter identifier of a first filter corresponding to the IP flow according to the first IP flow mapping information, before receiving the first IP flow mapping information sent from the UE and used for requesting to process the IP flow, the method further includes: a filter identifier or a routing rule identifier allocated by the PCRF for a filter included in the first PCC rule is determined.

In an alternative embodiment, the first filter identifier is carried in a filter identification AVP or a routing rule identification AVP.

Figure 7:
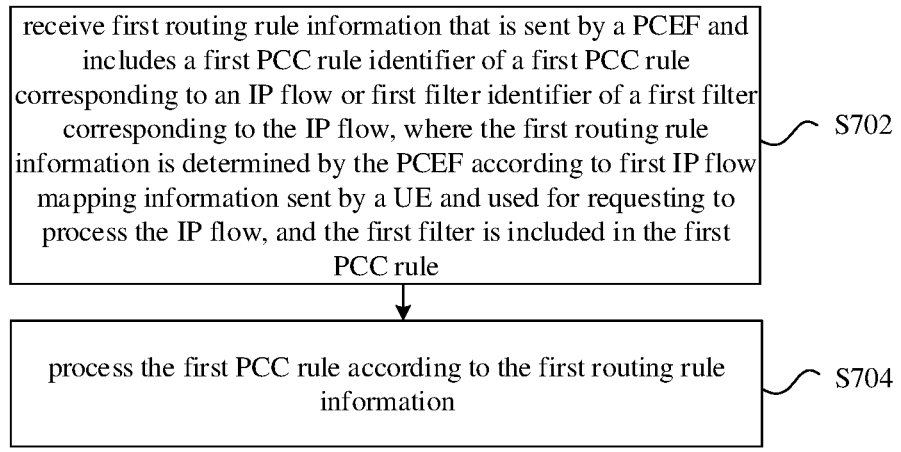
FIG. 7 is a flowchart of a second method for processing a PCC rule according to an embodiment of the disclosure.

In the present embodiment, a method for processing a PCC rule is also provided. FIG. 7 is a flowchart of a second method for processing a PCC rule according to an embodiment of the disclosure. As shown in FIG. 7, the flow includes the steps as follows.

In step S702, first routing rule information that is sent from a PCEF and includes a first PCC rule identifier of a first PCC rule corresponding to an IP flow or first filter identifier of a first filter corresponding to the IP flow is received, wherein the first routing rule information is determined by the PCEF according to first IP flow mapping information sent from a UE and used for requesting to process the IP flow, and the first filter is a filter included in the first PCC rule.

In step S704, the first PCC rule is processed according to the first routing rule information.

The above operations may be performed by a PCRF. Through the above steps, the PCRF may determine the identification information notified by the PCEF. Through the above steps, after receiving the related identification information, the PCRF may process a first PCC rule corresponding to the above identifier or a filter in the first PCC rule, so as to achieve the purpose of processing a PCC rule by the PCRF.

In an alternative embodiment, when the first IP flow mapping information is used for requesting to modify an allowed access network type of the IP flow, the first IP flow mapping information carries identification information of a second routing rule and a requested access network type corresponding to the IP flow, and the operation that the first PCC rule is processed according to the first routing rule information includes: when the first PCC rule only includes the first filter, an allowed access network type corresponding to the first PCC rule is updated with the requested access network type of the UE; or, when the first PCC rule includes two or more filters, the first filter is deleted from a service filter template of the first PCC rule, and a second PCC rule is generated according to the first filter, wherein an allowed access network type corresponding to the second PCC rule is the requested access network type.

In an alternative embodiment, when the first routing rule information includes the first PCC rule identifier and the first PCC rule includes two or more filters, the first routing rule information further carries the first filter.

In an alternative embodiment, when the first IP flow mapping information is used for requesting to delete a second routing rule corresponding to the IP flow, the first IP flow mapping information carries identification information of the second routing rule and information indicating that a requested processing type is deletion, and the operation that the first PCC rule is processed according to the first routing rule information includes: when the first PCC rule only includes the first filter, the first PCC rule is deleted; or, when the first PCC rule includes two or more filters, the first filter is deleted from a service filter template of the first PCC rule.

In an alternative embodiment, when the first routing rule information includes the first PCC rule identifier and the first PCC rule includes two or more filters, the first routing rule information further carries the first filter.

In an alternative embodiment, when the first IP flow mapping information is used for requesting to modify the first filter corresponding to the IP flow, the first IP flow mapping information carries identification information of a second routing rule corresponding to the IP flow, a new filter, and information indicating that a requested processing type is modification, and the operation that the first PCC rule is processed according to the first routing rule information includes: a service filter template in the first PCC rule is replaced with a filter carried in the first routing rule; or, a filter corresponding to the first filter identifier in a filter template in the first PCC rule is replaced with the new filter.

In an alternative embodiment, when the first routing rule information includes the first PCC rule identifier and the first PCC rule includes two or more filters, the first routing rule information further carries all filters other than the first filter in the first PCC rule.

In an alternative embodiment, when receiving first routing rule information that is sent from a PCEF and includes first filter identifier of a first filter corresponding to the IP flow, before receiving the first IP flow mapping information, the method further includes: a filter identifier or a routing rule identifier is allocated for a filter included in the first PCC rule; and the PCEF is notified of the allocated filter identifier or routing rule identifier.

In an alternative embodiment, the first filter identifier is carried in a filter identification AVP or a routing rule identification AVP.

The following further describes the disclosure with reference to specific embodiments.

Embodiment 1

Figure 8:
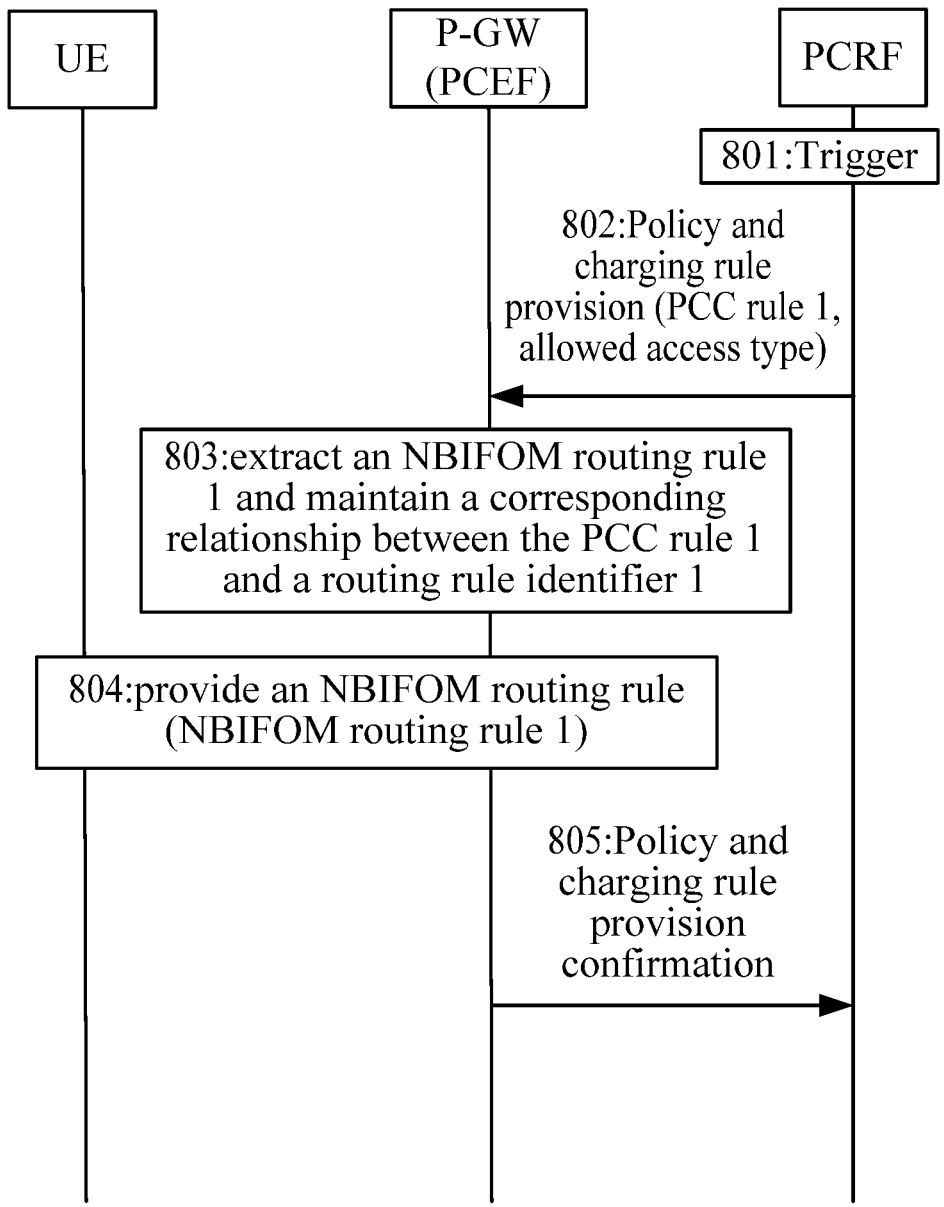
FIG. 8 is a flowchart of a PCRF-initiated network flow migration according to the present embodiment.

FIG. 8 is a flowchart of a PCRF-initiated network flow migration according to the present embodiment. As shown in FIG. 8, the flow includes the steps as follows.

In step S801, a PCRF determines to initiate a flow migration upon receiving a trigger. The trigger includes: receiving, by the PCRF, new service request information from an AF, making a PCC policy and determining an access network for new service transmission. Or, the PCRF needs to adjust an access network for the ongoing service transmission because of a network load, a contract change or a network policy change.

In step S802, the PCRF provides a message through a policy and charging rule to send a PCC Rule and an allowed access network type to a PCEF. The allowed access network type indicates that when the PCEF detects service data flows identified by the PCC Rule, these service data flows are sent to an access network indicated by the allowed access network type. The PCC Rule carries a PCC rule 1 (corresponding to the above first PCC rule) (PCC rule identifier 1) and a service data flow template, wherein one or more service data flow filters may be included.

In step S803, the PCEF installs the PCC rule 1 and associates the PCC rule 1 with the corresponding access network connection according to the allowed access network type. In addition, the PCEF extracts an NBIFOM routing rule 1 according to the received information. The NBIFOM routing rule 1 also includes information such as an NBIFOM routing rule identifier 1 (i.e., identification information of a second routing rule), a packet filter in the PCC rule, and the allowed access network type. If a service filter template in the PCC rule includes multiple packet filters, the PCEF extracts multiple NBIFOM routing rules. The PCEF needs to maintain a corresponding relationship between a PCC rule identifier and a routing rule identifier 1. If a PCC rule is corresponding to multiple NBIFOM routing rules, the PCEF needs to maintain a corresponding relationship between a PCC rule identifier and multiple NBIFOM routing rule identifiers. The PCEF may set the value of the NBIFOM routing rule identifier 1 according to the value of the identifier of the PCC rule 1. (For example, the value of the NBIFOM routing rule identifier 1 is wholly or partially set to the value of the PCC rule 1 identifier). That is, the NBIFOM routing rule identifier 1 carries the identifier information of the PCC rule 1.

In step S804, the PCEF sends an NBIFOM routing rule to a UE by using an existing flow.

In step S805, the PCEF returns a response message to the PCRF.

In other embodiments, the PCRF may allocate a filter identifier (indicated by a filter identifier 1) for each filter in the PCC rule, so that in step 803, the PCEF may also maintain a one-to-one corresponding relationship between filter identifiers and NBIFOM routing rule identifiers. The PCEF may set the value of the NBIFOM routing rule identifier 1 according to the value of the filter identifier 1 (e.g., the value of the NBIFOM routing rule identifier 1 is wholly or partially set to the value of the filter identifier 1), that is, the NBIFOM routing rule identifier 1 carries the information of the filter identifier 1 directly.

Figure 9:
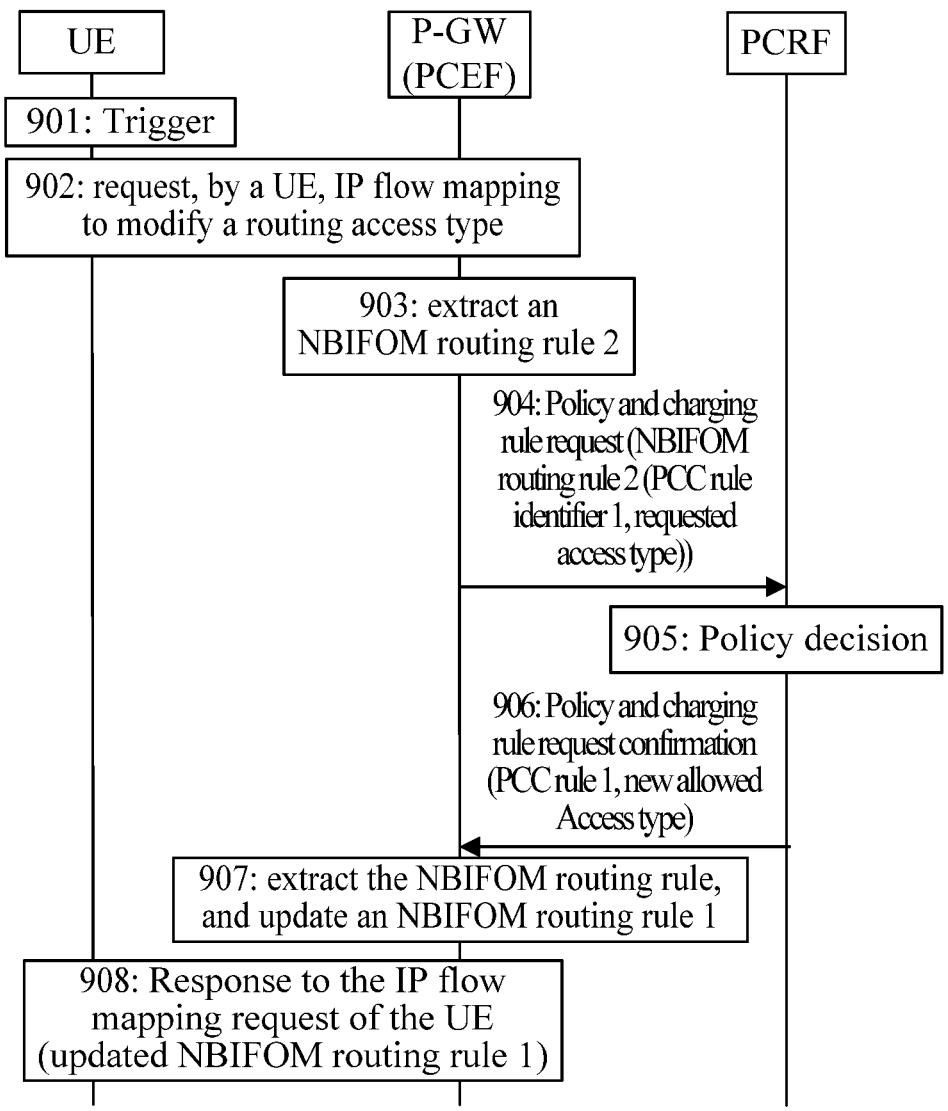
FIG. 9 is a flowchart of a UE requesting to modify request IP flow mapping of an allowed access network type of an NBIFOM routing rule issued in the flow shown in FIG. 8 according to an embodiment of the disclosure.

FIG. 9 is a flowchart of a UE requesting to modify request IP flow mapping of an allowed access network type of an NBIFOM routing rule issued in the flow shown in FIG. 8 according to an embodiment of the disclosure. As shown in FIG. 9, the flow includes the steps as follows.

In step S901, a UE determines to initiate an IP flow mapping request flow upon receiving a trigger. According to the trigger, the UE determines to change an access network for the ongoing service transmission because of a network load, a network policy, etc.

In step S902, the UE initiates an IP flow mapping request in the conventional art. A request message carries IP flow mapping information, and the information carries an NBIFOM routing rule identifier 1 (corresponding to the identifier of the above second routing rule) to be modified, and a requested access network type. The requested operation type is modification.

In step S903, a P-GW extracts an NBIFOM routing rule2 (corresponding to the above first routing rule) according to the IP flow mapping information, and finds the corresponding PCC rule 1 according to the NBIFOM routing rule identifier 1.

In step S904, a PCEF residing in the P-GW sends a policy and charging rule request message to a PCRF. The message carries the NBIFOM routing rule2 (corresponding to the above first routing rule) and an operation (modification or addition here) on the NBIFOM routing rule2. The NBIFOM routing rule2 includes a new NBIFOM routing rule identifier 2 and a PCC rule identifier 1 (corresponding to the identifier of the above second routing rule). It also includes a requested access network type (because the request access type is carried, the above message may not carry an operation type). If the PCC rule 1 is corresponding to multiple NBIFOM routing rules, the PCEF needs to carry a packet filter in an NBIFOM routing rule corresponding to the routing rule identifier 1 in the NBIFOM routing rule2 (that is, a packet filter of an NBIFOM routing rule requested by a UE for modification is carried). The PCEF may also set the NBIFOM routing rule identifier 2 according to the value of the PCC rule identifier 1 (for example, the value of the NBIFOM routing rule identifier 2 is wholly or partially set to the value of the PCC rule identifier 1), that is, the NBIFOM routing rule identifier 2 carries information of the PCC rule identifier 1. In this way, the NBIFOM routing rule2 carries only the NBIFOM routing rule identifier 2, and does not need to carry an additional PCC rule identifier 1, so the PCRF can identify the corresponding PCC rule.

In the embodiment of the disclosure, the NBIFOM routing rule and the operation on the NBIFOM routing rule are called routing rule information.

In step S905, the PCRF makes a policy decision. A stored PCC rule policy is found according to the PCC rule identifier 1 (according to the PCC rule identifier 1 carried alone or the PCC rule identifier 1 information carried in the NBIFOM routing rule identifier 2), and a new transmission access network (that is, allow access type) for a service data flow is determined according to a requested access network type. If the NBFIOM routing rule2 includes a packet filter, the PCRF will modify the original PCC rule 1, delete the packet filter from a service filter template of the PCC rule 1, make a PCC rule 2 (corresponding to the above second PCC rule) according to the packet filter, and determine the allowed access network type of the PCC rule 2.

In step S906, the PCRF returns a confirmation message. The PCC rule 1 and a new allowed access network type are carried in the message. If the PCRF makes a new PCC rule 2, the PCRF returns the updated PCC rule 1 and the newly-made PCC rule 2 as well as the corresponding allowed access network type to the PCEF.

In step S907, if the PCC rule 1 includes only one packet filter, the PCEF updates an NBIFOM routing rule 1 according to the received updated PCC rule 1 and a new allowed access network type, and a new allowed access network type is included in the NBIFOM routing rule 1. If the PCC rule 2 includes multiple packet filters, the PCEF updates the NBIFOM routing rule 1 according to the received PCC rule 2 and the corresponding allow access type, a new allowed access network type is included in the NBIFOM routing rule 1, and the PCEF maintains a corresponding relationship between the routing rule identifier 1 and the PCC rule 2 identifier.

In step S908, the P-GW residing in the PCEF returns a response to the UE and carries the NBIFOM routing rule.

In an alternative embodiment, if the PCEF maintains a corresponding relationship between filter identifiers and NBIFIOM routing rule identifiers in the PCC rule, in step 903, the P-GW extracts the NBIFOM routing rule2 (corresponding to the above first routing rule) and the operation on the NBIFOM routing rule2 (addition or modification here) according to the IP flow mapping information, and finds the corresponding PCC rule 1 and filter identifier 1 according to the NBIFOM routing rule identifier 1. In step 904, the PCEF sends a policy and charging rule request message to the PCRF. The message carries the NBIFOM routing rule2 (corresponding to the above first routing rule) and the operation on the NBIFOM routing rule2. The NBIFO M routing rule2 includes a new NBIFOM routing rule identifier 2 and filter identifier 1 (corresponding to the above first filter identifier). (The PCEF may also set the NBIFOM routing rule identifier 2 according to the value of the filter identifier 1 (for example, the value of the NBIFOM routing rule identifier 2 is wholly or partially set to the value of the PCC rule identifier 1), that is, the NBIFOM routing rule identifier 2 carries the information of the PCC rule identifier 1. In this way, the NBIFOM routing rule 2 carries only the NBIFOM routing rule identifier 2, and does not need to carry an additional filter identifier 1). It also includes a requested access network type. In step 905, the PCRF makes a policy decision. The stored PCC rule policy is found according to the filter identifier 1 (according to the filter identifier 1 carried alone or the filter identifier 1 information carried in the NBIFOM routing rule identifier 2), and a new transmission access network (that is, allow access type) of an IP flow is determined according to the requested access network type. If the PCC rule includes multiple packet filters, the PCRF will modify the original PCC rule 1, delete the packet filter corresponding to the filter identifier 1 from a service filter template of the PCC rule 1, make a PCC rule 2 (corresponding to the above second PCC rule) according to the packet filter of the filter identifier 1, and determine the allowed access network type of the PCC rule 2.

Figure 10:
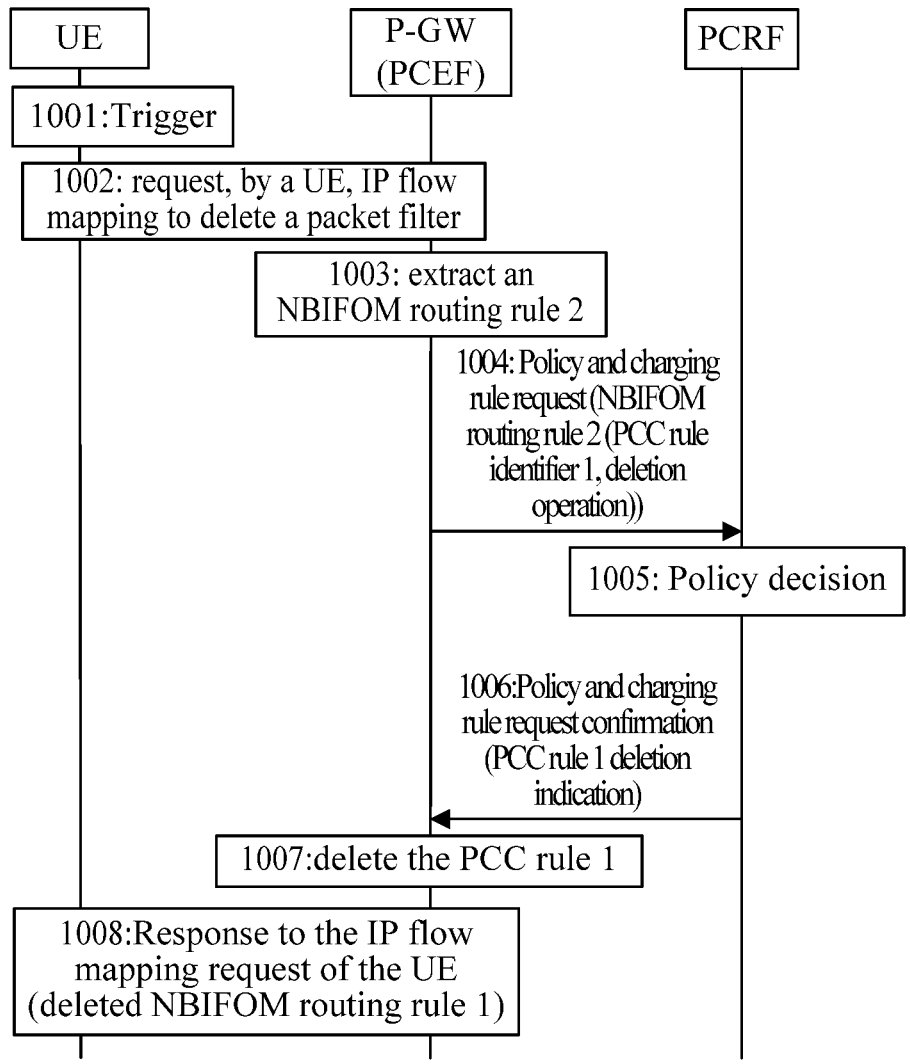
FIG. 10 is a flowchart of a UE requesting to delete request IP flow mapping of a packet filter of an NBIFOM routing rule issued in the flow shown in FIG. 8 according to an embodiment of the disclosure.

FIG. 10 is a flowchart of a UE requesting to delete request IP flow mapping of a packet filter of an NBIFOM routing rule issued in the flow shown in FIG. 8 according to an embodiment of the disclosure. As shown in FIG. 10, the flow includes the steps as follows.

In step S1001, a UE determines to initiate an IP flow mapping request flow upon receiving a trigger. According to the trigger, the UE determines to delete the ongoing service because of changes in service information. That is, an NBIFOM routing rule corresponding to the service is deleted.

In step S1002, the UE sends an IP flow mapping request to a network in the conventional art. A request message carries IP flow mapping information, and the information carries an NBIFOM routing rule identifier 1 (corresponding to the identifier of the above second routing rule) to be deleted. The requested operation type is deletion.

In step S1003, a P-GW extracts an NBIFOM routing rule2 (corresponding to the above first routing rule) and an operation (deletion here) on the NBIFOM routing rule2 according to the IP flow mapping information, and finds a corresponding PCC rule 1 according to the NBIFOM routing rule identifier 1.

In step S1004, a PCEF residing in the P-GW sends a policy and charging rule request message to a PCRF. The message carries the NBIFOM routing rule2 (corresponding to the above first routing rule) and the operation on the NBIFOM routing rule2. The NBIFOM routing rule2 includes a new NBIFOM routing rule identifier 2 (corresponding to the identifier of the above first routing rule) and a PCC rule identifier 1. The PCEF may also set the NBIFOM routing rule identifier 2 according to the value of the PCC rule identifier 1 (for example, the value of the NBIFOM routing rule identifier 2 is wholly or partially set to the value of the PCC rule identifier 1), that is, the NBIFOM routing rule identifier 2 carries information of the PCC rule identifier 1. In this way, the NBIFOM routing rule2 carries only the NBIFOM routing rule identifier 2, and does not need to carry an additional PCC rule identifier 1, so the PCRF can identify the corresponding PCC rule. If the PCC rule 1 is corresponding to multiple NBIFOM routing rules, the PCEF also carries a Packet filter requesting deletion.

In step S1005, the PCRF makes a policy decision. A stored PCC rule policy is found according to the PCC rule identifier 1 (according to the PCC rule identifier 1 carried alone or the PCC rule identifier 1 information carried in the NBIFOM routing rule identifier 2). If the NBFIOM routing rule2 does not carry a Packet filter (that is, there is only one Packet filter in the PCC rule), the PCRF deletes the PCC rule 1. If the NBFIOM routing rule2 carries a packet filter, the PCRF determines to delete the packet filter from a service filter template of the PCC rule according to the reported packet filter, and the PCRF updates the PCC rule 1.

In step S1006, the PCRF returns a confirmation message. If the PCRF updates the PCC rule 1, the PCRF returns the PCC rule 1. If the PCRF deletes the PCC rule 1, the PCRF instructs the PCEF to delete the rule 1.

In step S1007, the PCEF updates or deletes the PCC rule 1.

In step S1008, the P-GW residing in the PCEF returns a response to the UE.

In an alternative embodiment, if the PCEF maintains a corresponding relationship between filter identifiers and NBIFIOM routing rule identifiers in the PCC rule, in step 1003, the P-GW extracts an NBIFOM routing rule2 (corresponding to the above first routing rule) and an operation (deletion here) on the NBIFOM routing rule2 according to the IP flow mapping information, and finds a corresponding PCC rule 1 and filter identifier 1 according to the NBIFOM routing rule identifier 1. In step 1004, the PCEF sends a policy and charging rule request message to the PCRF. The message carries the NBIFOM routing rule2 (corresponding to the above first routing rule) and the operation on the NBIFOM routing rule2. The NBIFOM routing rule2 includes a new NBIFOM routing rule identifier 2 (corresponding to the identifier of the above first routing rule) and a filter identifier 1. (The PCEF may also set the NBIFOM routing rule identifier 2 according to the value of the filter identifier 1 (for example, the value of the NBIFOM routing rule identifier 2 is wholly or partially set to the value of the PCC rule identifier 1). In this way, the NBIFOM routing rule2 carries only the NBIFOM routing rule identifier 2, and does not need to carry an additional filter identifier 1). In step 1005, the PCRF makes a policy decision. A stored PCC rule policy is found according to the filter identifier 1 (according to the filter identifier 1 carried alone or the filter identifier 1 information carried in the NBIFOM routing rule identifier 2), and the PCC rule 1 is deleted. If the PCC rule includes multiple packet filters, the PCRF will modify the original PCC rule 1 and delete the packet filter corresponding to the filter identifier 1 from a service filter template of the PCC rule 1.

Figure 11:
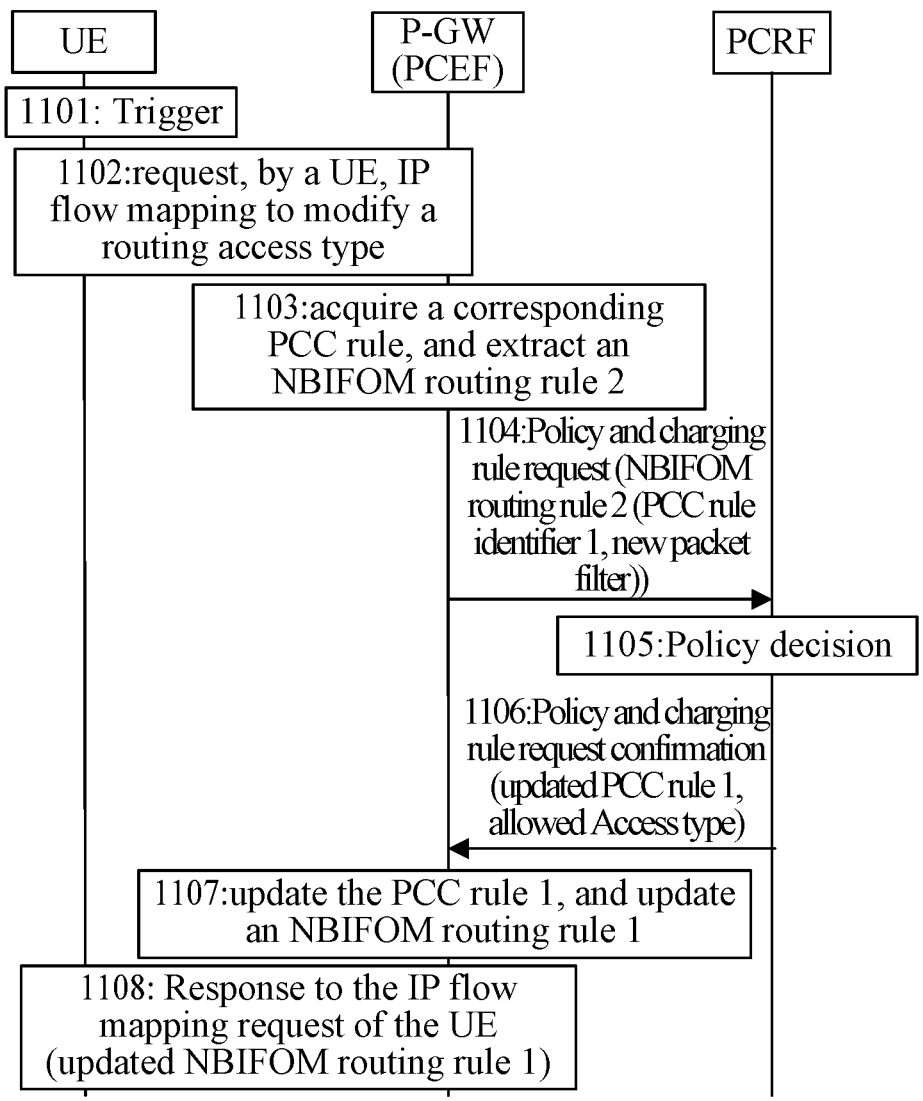
FIG. 11 is a flowchart of a UE requesting to modify request IP flow mapping of a packet filter of an NBIFOM routing rule issued in the flow shown in FIG. 8 according to an embodiment of the disclosure.

FIG. 11 is a flowchart of a UE requesting to modify request IP flow mapping of a packet filter of an NBIFOM routing rule issued in the flow shown in FIG. 8 according to an embodiment of the disclosure. As shown in FIG. 11, the flow includes the steps as follows.

In step S1101, a UE determines to initiate an IP flow mapping request flow upon receiving a trigger. According to the trigger, the UE determines to change an IP flow access network for the ongoing service because of changes in service information.

In step S1102, the UE sends an IP flow mapping request in the conventional art. A request message carries IP flow mapping information, and the information carries an NBIFOM routing rule identifier 1 (corresponding to the identifier of the above second routing rule) to be deleted, and a new packet filter. The requested operation type is modification.

In step S1103, a P-GW extracts an NBIFOM routing rule2 (corresponding to the above second routing rule) and an operation (modification here) on the NBIFOM routing rule2 according to the IP flow mapping information, and finds a corresponding PCC rule 1 according to the NBIFOM routing rule identifier 1.

In step S1104, a PCEF residing in the P-GW sends a policy and charging rule request message to a PCRF. The message carries the NBIFOM routing rule2 and the operation on the NBIFOM routing rule2. The NBIFOM routing rule2 includes a new NBIFOM routing rule identifier 2 (corresponding to the identifier of the above second routing rule), a PCC rule identifier 1, and a new packet filter. The PCEF may also set the NBIFOM routing rule identifier 2 according to the value of the PCC rule identifier 1 (for example, the value of the NBIFOM routing rule identifier 2 is wholly or partially set to the value of the PCC rule identifier 1), that is, the NBIFOM routing rule identifier 2 carries information of the PCC rule identifier 1. In this way, the NBIFOM routing rule2 carries only the NBIFOM routing rule identifier 2, and does not need to carry an additional PCC rule identifier 1, so the PCRF can identify the corresponding PCC rule. If the PCC rule 1 is corresponding to multiple NBIFOM routing rules, the PCEF carries, in addition to the new packet filter, all other unmodified packet filters of the NBIFOM routing rule corresponding to the PCC rule 1.

In step S1105, the PCRF makes a policy decision. A stored PCC rule policy is found according to the PCC rule identifier 1 (according to the PCC rule identifier 1 carried alone or the PCC rule identifier 1 information carried in the NBIFOM routing rule identifier 2), and a service filter template in the PCC rule 1 is updated according to all the reported packet filters.

In step S1106, the PCRF returns a confirmation message, and the message carries the updated PCC rule 1 and an allowed access network type.

In step S1107, the PCEF updates the NBIFOM routing rule 1 according to the received information, and the new packet filter is carried in the NBIFOM routing rule 1. If the PCC rule 1 is corresponding to multiple NBIFOM routing rules, the original NBIFOM routing rule does not change for packet filters that have not been modified. For the modified packet filters, the PCEF updates the NBIFOM routing rule with the modified packet filters.

In step S1108, the P-GW residing in the PCEF returns a response to the UE, carrying the updated NBIFOM routing rule.

In an alternative embodiment, if the PCEF maintains a corresponding relationship between filter identifiers and NBIFIOM routing rule identifiers in the PCC rule, in step 1103, the P-GW extracts an NBIFOM routing rule2 (corresponding to the above first routing rule) and an operation (modification here) on the NBIFOM routing rule2 according to the IP flow mapping information, and finds a corresponding PCC rule 1 and filter identifier 1 according to the NBIFOM routing rule identifier 1. In step 1104, the PCEF sends a policy and charging rule request message to the PCRF. The message carries the NBIFOM routing rule2 (corresponding to the above first routing rule) and the operation on the NBIFOM routing rule2. The NBIFOM routing rule2 includes a new NBIFOM routing rule identifier 2 (corresponding to the identifier of the above first routing rule), a filter identifier 1, and a new Packet filter. (The PCEF may also set the NBIFOM routing rule identifier 2 according to the value of the filter identifier 1 (for example, the value of the NBIFOM routing rule identifier 2 is wholly or partially set to the value of the PCC rule identifier 1), that is, the NBIFOM routing rule identifier 2 carries information of the PCC rule identifier 1. In this way, the NBIFOM routing rule2 carries only the NBIFOM routing rule identifier 2, and does not need to carry an additional filter identifier 1). In step 1105, the PCRF makes a policy decision. A stored PCC rule policy is found according to the filter identifier 1 (according to the filter identifier 1 carried alone or the filter identifier 1 information carried in the NBIFOM routing rule identifier 2), and a filter corresponding to the filter identifier 1 in a service filter template is replaced with a new packet filter. In the above embodiment in which the PCRF allocates a filter identifier to each filter, since the filter identifier 1 and the NBIFOM routing rule identifier 1 and the NBIFOM routing rule identifier 2 have a one-to-one corresponding relationship, the PCRF may be considered to pre-allocate an NBIFOM routing rule identifier for each filter. That is, in the embodiment of FIG. 8, the PCRF allocates an NBIFOM routing rule identifier (herein denoted as NBIFOM routing rule identifier 3) for each filter. In the flows of FIG. 9, FIG. 10 and FIG. 11, the NBIFOM routing rule identifier 2 carried in the NBIFOM routing rule 2 generated by the PCEF is set according to the value of the NBIFOM routing rule identifier 3 (for example, the value of the NBIFOM routing rule identifier 2 is wholly or partially set to the value of the NBIFOM routing rule identifier 3). The value of the NBIFOM routing rule identifier 2 is the same as the value of the NBIFOM routing rule identifier 3, that is, the NBIFOM routing rule identifier 2 is the NBIFOM routing rule identifier 3.

Through the description of the above implementation manner, those skilled in the art may clearly understand that the method according to the above embodiment may be implemented by means of software plus a necessary general hardware platform. Of course, the hardware may also be used, but in many cases, the former is a better implementation manner. Based on this understanding, the essence of the technical solution of the disclosure or parts contributing to the conventional art may be embodied in the form of a software product. The computer software product is stored in a storage medium (such as a Read-Only Memory (ROM)/Random Access Memory (RAM), a magnetic disk, and an optical disc), including a plurality of instructions for enabling a terminal device (which may be a mobile phone, a computer, a server, or a network device, etc.) to perform the methods described in the various embodiments of the disclosure.

In the present embodiment, an apparatus for processing a PCC rule is also provided. The apparatus is used to implement the above embodiment and preferable implementation manner. Those which have been illustrated will not be elaborated herein. Just as a term 'module' used below, the combination of software and/or hardware with predetermined functions may be implemented. Although the apparatus described by the following embodiment is better implemented by software, the implementation of hardware or the combination of software and hardware may be possible and conceived.

Figure 12:
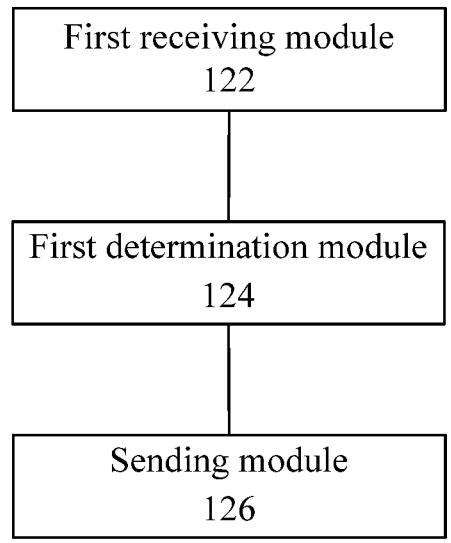
FIG. 12 is a block diagram of a first apparatus for processing a PCC rule according to an embodiment of the disclosure.

FIG. 12 is a block diagram of a first apparatus for processing a PCC rule according to an embodiment of the disclosure. As shown in FIG. 12, the apparatus includes a first receiving module 122, a first determination module 124 and a sending module 126. The apparatus will be described below.

The first receiving module 122 is configured to receive first IP flow mapping information sent from a UE and used for requesting to process an IP flow; the first determination module 124 is connected to the first receiving module 122, and is configured to determine, according to the first IP flow mapping information, first routing rule information including a first PCC rule identifier of a first PCC rule corresponding to the IP flow or first filter identifier of a first filter corresponding to the IP flow, wherein the first filter is a filter included in the first PCC rule; and the sending module 126 is connected to the first determination module 124, and is configured to send the first routing rule information to a PCRF, so as to instruct the PCRF to process the first PCC rule according to the first routing rule information.

Figure 13:
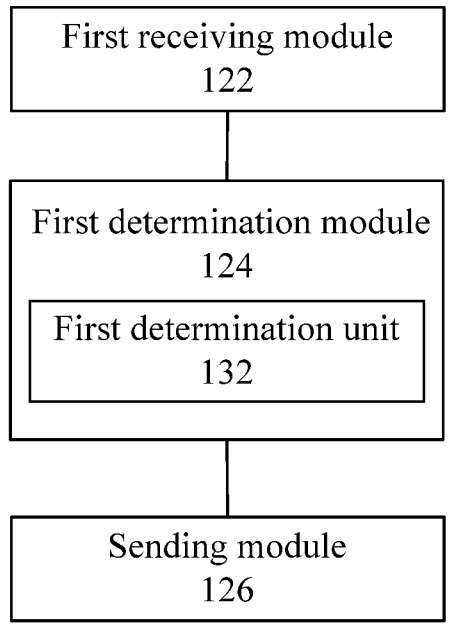
FIG. 13 is a block diagram 1 of a first determination module 124 in a first apparatus for processing a PCC rule according to the present embodiment.

In an alternative embodiment, when the first IP flow mapping information is used for requesting to modify an allowed access network type of the IP flow, the first IP flow mapping information carries identification information of a second routing rule and a requested access network type corresponding to the IP flow. FIG. 13 is a block diagram 1 of a first determination module 124 in a first apparatus for processing a PCC rule according to the present embodiment. As shown in FIG. 13, the first determination module 124 includes a first determination unit 132. The first determination module 124 will be described below.

The first determination unit 132 is configured to determine the first PCC rule identifier or the first filter identifier according to the identification information of the second routing rule, wherein the first routing rule information further includes the requested access network type.

In an alternative embodiment, when the first routing rule information includes the first PCC rule identifier and the first PCC rule includes two or more filters, the first routing rule information further carries the first filter.

Figure 14:
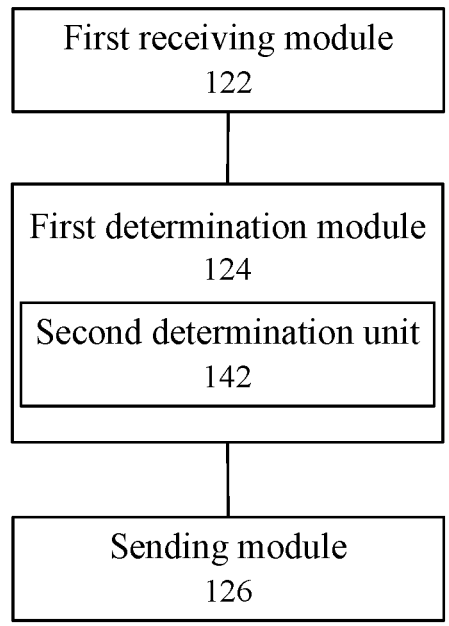
FIG. 14 is a block diagram 2 of a first determination module 124 in a first apparatus for processing a PCC rule according to the present embodiment.

In an alternative embodiment, when the first IP flow mapping information is used for requesting to delete a second routing rule corresponding to the IP flow, the first IP flow mapping information carries identification information of the second routing rule and information indicating that a requested processing type is deletion. FIG. 14 is a block diagram 2 of a first determination module 124 in a first apparatus for processing a PCC rule according to the present embodiment. As shown in FIG. 14, the first determination module 124 includes a second determination unit 142. The first determination module 124 will be described below.

The second determination unit 142 is configured to determine the first PCC rule identifier or the first filter identifier according to the identification information of the second routing rule, wherein the first routing rule information further includes information indicating that the requested processing type is deletion.

In an alternative embodiment, when the first routing rule information includes the first PCC rule identifier and the first PCC rule includes two or more filters, the first routing rule information further carries the first filter.

Figure 15:
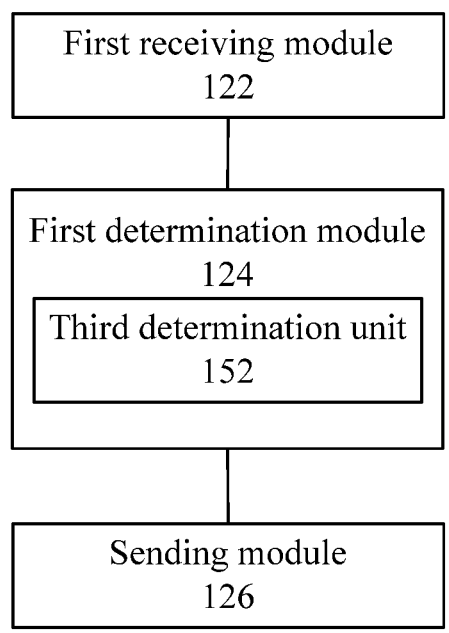
FIG. 15 is a block diagram 3 of a first determination module 124 in a first apparatus for processing a PCC rule according to the present embodiment.

In an alternative embodiment, when the first IP flow mapping information is used for requesting to modify the first filter corresponding to the IP flow, the first IP flow mapping information carries identification information of a second routing rule corresponding to the IP flow, a new filter, and information indicating that a requested processing type is modification. FIG. 15 is a block diagram 3 of a first determination module 124 in a first apparatus for processing a PCC rule according to the present embodiment. As shown in FIG. 15, the first determination module 124 includes a third determination unit 152. The first determination module 124 will be described below.

The third determination unit 152 is configured to determine the first PCC rule identifier or the first filter identifier according to the identification information of the second routing rule, wherein the first routing rule information further includes the new filter and information indicating that the requested processing type is modification.

In an alternative embodiment, when the first routing rule information includes the first PCC rule identifier and the first PCC rule includes two or more filters, the first routing rule information further carries all filters other than the first filter in the first PCC rule.

Figure 16:
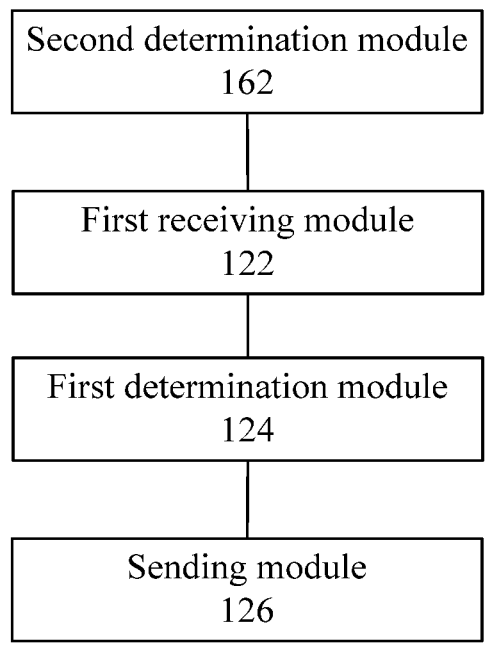
FIG. 16 is a preferred block diagram of a first apparatus for processing a PCC rule according to the present embodiment.

FIG. 16 is a preferred block diagram of a first apparatus for processing a PCC rule according to the present embodiment. As shown in FIG. 16, the apparatus includes, in addition to all the modules as shown in FIG. 12, a second determination module 162. The apparatus will be described below.

The second determination module 162 is connected to the first receiving module 122, and is configured to determine a filter identifier or a routing rule identifier allocated by the PCRF for a filter included in the first PCC rule when determining, according to the first IP flow mapping information, first routing rule information including first filter identifier of a first filter corresponding to the IP flow, and before receiving the first IP flow mapping information sent from the UE and used for requesting to process the IP flow.

In an alternative embodiment, the first filter identifier is carried in a filter identification AVP or a routing rule identification AVP.

Figure 17:
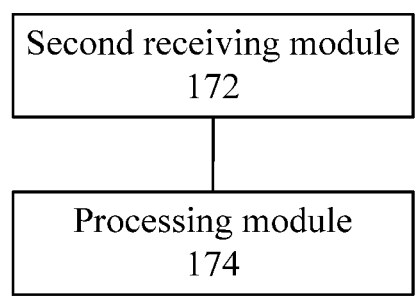
FIG. 17 is a block diagram of a second apparatus for processing a PCC rule according to the present embodiment.

FIG. 17 is a block diagram of a second apparatus for processing a PCC rule according to the present embodiment. As shown in FIG. 17, the apparatus includes a second receiving module 172 and a processing module 174. The apparatus will be described below.

The second receiving module 172 is configured to receive first routing rule information that is sent from a PCEF and includes a first PCC rule identifier of a first PCC rule corresponding to an IP flow or first filter identifier of a first filter corresponding to the IP flow, wherein the first routing rule information is determined by the PCEF according to first IP flow mapping information sent from a UE and used for requesting to process the IP flow, and the first filter is a filter included in the first PCC rule; and the processing module 174 is connected to the second receiving module 172, and is configured to process the first PCC rule according to the first routing rule information.

Figure 18:
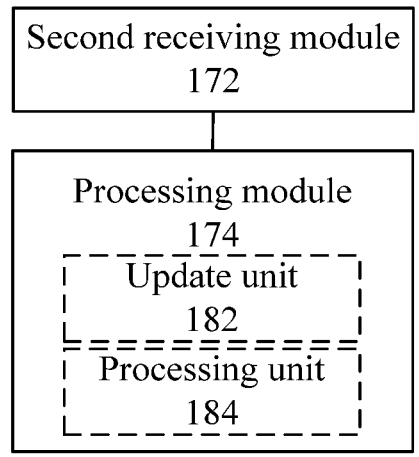
FIG. 18 is a block diagram 1 of a processing module 174 in a second apparatus for processing a PCC rule according to the present embodiment.

In an alternative embodiment, when the first IP flow mapping information is used for requesting to modify an allowed access network type of the IP flow, the first IP flow mapping information carries identification information of a second routing rule and a requested access network type corresponding to the IP flow. FIG. 18 is a block diagram 1 of a processing module 174 in a second apparatus for processing a PCC rule according to the present embodiment. As shown in FIG. 18, the processing module 174 includes an update unit 182 or a processing unit 184. The processing module 174 will be described below.

The update unit 182 is configured to update, when the first PCC rule only includes the first filter, an allowed access network type corresponding to the first PCC rule, with the requested access network type of the UE; and the processing unit 184 is configured to delete, when the first PCC rule includes two or more filters, the first filter from a service filter template of the first PCC rule, and generate a second PCC rule according to the first filter, wherein an allowed access network type corresponding to the second PCC rule is the requested access network type.

In an alternative embodiment, when the first routing rule information includes the first PCC rule identifier and the first PCC rule includes two or more filters, the first routing rule information further carries the first filter.

Figure 19:
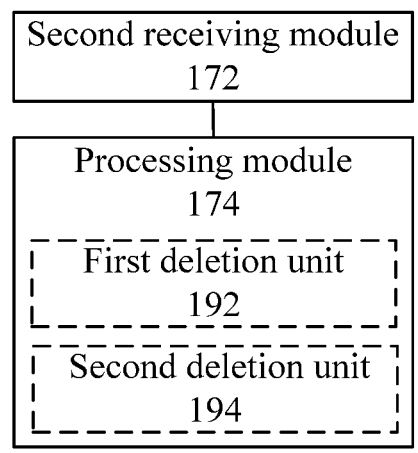
FIG. 19 is a block diagram 2 of a processing module 174 in a second apparatus for processing a PCC rule according to the present embodiment.

In an alternative embodiment, when the first IP flow mapping information is used for requesting to delete a second routing rule corresponding to the IP flow, the first IP flow mapping information carries identification information of the second routing rule and information indicating that a requested processing type is deletion. FIG. 19 is a block diagram 2 of a processing module 174 in a second apparatus for processing a PCC rule according to the present embodiment. As shown in FIG. 19, the processing module 174 includes a first deletion unit 192 or a second deletion unit 194. The processing module 174 will be described below.

The first deletion unit 192 is configured to delete, when the first PCC rule only includes the first filter, the first PCC rule; and the second deletion unit 194 is configured to delete, when the first PCC rule includes two or more filters, the first filter from a service filter template of the first PCC rule.

In an alternative embodiment, when the first routing rule information includes the first PCC rule identifier and the first PCC rule includes two or more filters, the first routing rule information further carries the first filter.

Figure 20:
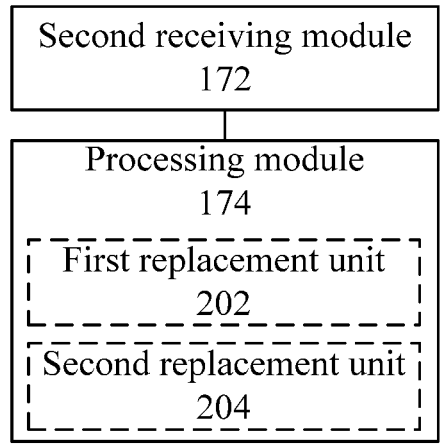
FIG. 20 is a block diagram 3 of a processing module 174 in a second apparatus for processing a PCC rule according to the present embodiment.

In an alternative embodiment, when the first IP flow mapping information is used for requesting to modify the first filter corresponding to the IP flow, the first IP flow mapping information carries identification information of a second routing rule corresponding to the IP flow, a new filter, and information indicating that a requested processing type is modification. FIG. 20 is a block diagram 3 of a processing module 174 in a second apparatus for processing a PCC rule according to the present embodiment. As shown in FIG. 20, the processing module 174 includes a first replacement unit 202 or a second replacement unit 204. The processing module 174 will be described below.

The first replacement unit 202 is configured to replace a service filter template in the first PCC rule with a filter carried in the first routing rule; and the second replacement unit 204 is configured to replace a filter corresponding to the first filter identifier in a filter template in the first PCC rule with the new filter.

In an alternative embodiment, when the first routing rule information includes the first PCC rule identifier and the first PCC rule includes two or more filters, the first routing rule information further carries all filters other than the first filter in the first PCC rule.

Figure 21:
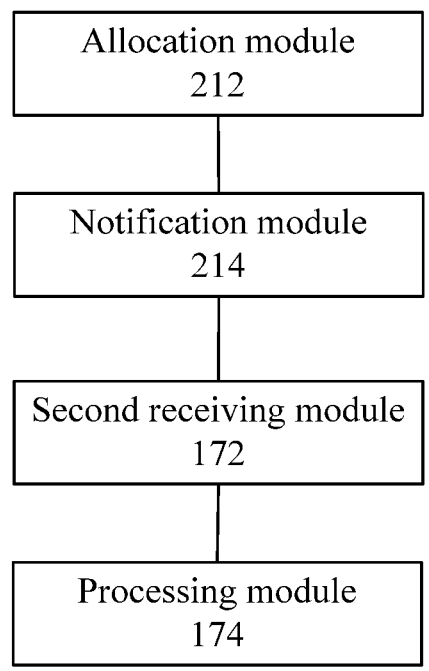
FIG. 21 is a preferred block diagram of a second apparatus for processing a PCC rule according to the present embodiment.

FIG. 21 is a preferred block diagram of a second apparatus for processing a PCC rule according to the present embodiment. As shown in FIG. 21, the apparatus includes, in addition to all the modules as shown in FIG. 17, an allocation module 212 and a notification module 214. The apparatus will be described as follows.

The allocation module 212 is configured to allocate a filter identifier or a routing rule identifier for a filter included in the first PCC rule when receiving first routing rule information that is sent from a PCEF and includes first filter identifier of a first filter corresponding to the IP flow and before receiving the first IP flow mapping information; and the notification module 214 is connected to the allocation module 212 and the second receiving module 172, and is configured to notify the PCEF of the allocated filter identifier or routing rule identifier.

In an alternative embodiment, the first filter identifier is carried in a filter identification AVP or a routing rule identification AVP.

It should be noted that the above modules may be implemented by software or hardware. For the latter, it may be implemented in the following manner, but not limited to: the above modules are all located in the same processor; or the above modules are respectively located in multiple processors.

The embodiment of the disclosure also provides a storage medium. Alternatively, in the present embodiment, the storage medium may be configured to store a program code for performing the following steps.

In S1, first IP flow mapping information sent from a UE and used for requesting to process an IP flow is received.

In S2, according to the first IP flow mapping information, first routing rule information including a first PCC rule identifier of a first PCC rule corresponding to the IP flow or first filter identifier of a first filter corresponding to the IP flow is determined, wherein the first filter is a filter included in the first PCC rule.

In S3, the first routing rule information is sent to a PCRF, so as to instruct the PCRF to process the first PCC rule according to the first routing rule information.

Alternatively, the storage medium may be also configured to store a program code for performing the following steps.

In S1, first routing rule information that is sent from a PCEF and includes a first PCC rule identifier of a first PCC rule corresponding to an IP flow or first filter identifier of a first filter corresponding to the IP flow is received, wherein the first routing rule information is determined by the PCEF according to first IP flow mapping information sent from a UE and used for requesting to process the IP flow, and the first filter is a filter included in the first PCC rule.

In S2, the first PCC rule is processed according to the first routing rule information.

Alternatively, in the present embodiment, the storage medium may include, but is not limited to, various media capable of storing the program codes such as a U disk, a ROM, a RAM, a mobile hard disk, a magnetic disk or an optical disc.

Alternatively, in the present embodiment, the processor performs the steps in the above embodiments according to the stored program codes in the storage medium.

Alternatively, for specific examples in the present embodiment, reference may be made to the examples described in the above embodiments and alternative implementation manners, which are not described herein again in the present embodiment.

Obviously, those skilled in the art shall understand that all of the above modules or steps in the disclosure may be implemented by using a general calculation apparatus, may be centralized on a single calculation apparatus or may be distributed on a network composed of a plurality of calculation apparatuses. Alternatively, they may be implemented by using executable program codes of the calculation apparatuses. Thus, they may be stored in a storage apparatus and executed by the calculation apparatuses, or they are manufactured into each integrated circuit module respectively, or multiple modules or steps therein are manufactured into a single integrated circuit module. Thus, the disclosure is not limited to a combination of any specific hardware and software.

The above is only the preferred embodiments of the disclosure, and not intended to limit the disclosure. There may be various modifications and variations in the disclosure for those skilled in the art. Any modifications, equivalent replacements, improvements and the like made within the spirit and principle of the disclosure shall fall within the scope of protection of the disclosure.

INDUSTRIAL APPLICABILITY

As described above, the method and apparatus for processing a PCC rule provided according to the embodiment of the disclosure have the following beneficial effects: the problem in the related art that a PCRF is unable to modify a PCC rule is solved, thus achieving the effect of allowing the PCRF to modify the PCC rule.

The invention claimed is:

1. A method for processing a Policy and Charging Control (PCC) rule, comprising:
  receiving first Internet Protocol (IP) flow mapping information sent from a User Equipment (UE) and used for requesting to process an IP flow, wherein the first IP flow mapping information carries a second routing rule identifier of a routing rule of a first filter corresponding to the IP flow;
  determining, according to the first IP flow mapping information, first routing rule information comprising a first routing rule identifier of the routing rule of the first filter corresponding to the IP flow, wherein the first filter is comprised in a first PCC rule, and wherein the first routing rule identifier of the first filter is allocated by a Policy and Charging Rules Function (PCRF), for the first filter comprised in the first PCC rule; and
  sending the first routing rule information to the PCRF, so as to instruct the PCRF to process the first PCC rule according to the first routing rule information,
  wherein determining the first routing rule information of the IP flow according to the first IP flow mapping information comprises: determining the first routing rule identifier according to the second routing rule identifier.

2. The method according to claim 1, wherein when the first IP flow mapping information is used for requesting to modify an allowed access network type of the IP flow, the first IP flow mapping information further carries a requested access network type corresponding to the IP flow, wherein the first routing rule information further comprises the requested access network type.

3. The method according to claim 2, wherein processing, by the PCRF, the first PCC rule according to the first routing rule information comprises:
  when the first PCC rule only comprises the first filter, updating, by the PCRF, an allowed access network type corresponding to the first PCC rule, with the requested access network type; or
  when the first PCC rule comprises two or more filters, deleting, by the PCRF, the first filter from a service filter template of the first PCC rule, and generating a second PCC rule according to the first filter, wherein an allowed access network type corresponding to the second PCC rule is the requested access network type.

4. The method according to claim 1, wherein when the first IP flow mapping information is used for requesting to delete a routing rule corresponding to the IP flow.

5. The method according to claim 4, wherein processing, by the PCRF, the first PCC rule according to the first routing rule information comprises:
  when the first PCC rule only comprises the first filter, deleting, by the PCRF, the first PCC rule; or
  when the first PCC rule comprises two or more filters, deleting, by the PCRF, the first filter from a service filter template of the first PCC rule.

6. The method according to claim 1, wherein when the first IP flow mapping information is used for requesting to modify the first filter corresponding to the IP flow, the first IP flow mapping information further carries a new filter corresponding to the IP flow, wherein the first routing rule information further comprises the new filter.

7. The method according to claim 6, wherein processing, by the PCRF, the first PCC rule according to the first routing rule information comprises:
  replacing, by the PCRF, a service filter template in the first PCC rule with a filter carried in the first routing rule.

8. The method according to claim 6, wherein processing, by the PCRF, the first PCC rule according to the first routing rule information comprises:
  replacing, by the PCRF, a filter corresponding to the first routing rule identifier in a filter template in the first PCC rule with the new filter.

9. A method for processing a Policy and Charging Control (PCC) rule, comprising:
  allocating a first routing rule identifier for a routing rule of a first filter comprised in a first PCC rule and corresponding to an Internet Protocol (IP) flow;

notifying a Policy and Charging Enforcement Function (PCEF) of the first routing rule identifier;

receiving first routing rule information that is sent from the PCEF and comprises the first routing rule identifier, wherein the first routing rule information is determined by the PCEF according to first IP flow mapping information sent from a User Equipment (UE) and used for requesting to process the IP flow, wherein the first IP flow mapping information carries a second routing rule identifier of the routing rule of the first filter corresponding to the IP flow, and the first routing rule identifier is determined according to the second routing rule identifier; and processing the first PCC rule according to the first routing rule information.

10. The method according to claim 9, wherein when the first IP flow mapping information is used for requesting to modify an allowed access network type of the IP flow, the first IP flow mapping information further carries a requested access network type corresponding to the IP flow, and processing the first PCC rule according to the first routing rule information comprises:

when the first PCC rule only comprises the first filter, updating an allowed access network type corresponding to the first PCC rule, with the requested access network type; or when the first PCC rule comprises two or more filters, deleting the first filter from a service filter template of the first PCC rule, and generating a second PCC rule according to the first filter, wherein an allowed access network type corresponding to the second PCC rule is the requested access network type.

11. The method according to claim 9, wherein when the first IP flow mapping information is used for requesting to delete a routing rule corresponding to the IP flow, and processing the first PCC rule according to the first routing rule information comprises:

when the first PCC rule only comprises the first filter, deleting the first PCC rule; or when the first PCC rule comprises two or more filters, deleting the first filter from a service filter template of the first PCC rule.

12. The method according to claim 9, wherein when the first IP flow mapping information is used for requesting to modify the first filter corresponding to the IP flow, the first IP flow mapping information further carries a new filter corresponding to the IP flow, and processing the first PCC rule according to the first routing rule information comprises:

replacing a service filter template in the first PCC rule with a filter carried in the first routing rule; or replacing a filter corresponding to the first routing rule identifier in a filter template in the first PCC rule with the new filter.

13. An apparatus for processing a Policy and Charging Control (PCC) rule, comprising a processor and a memory for storing instructions that, when executed by the processor, are configured to cause the processor to:

receive first Internet Protocol (IP) flow mapping information sent from a User Equipment (UE) and used for requesting to process an IP flow, wherein the first IP flow mapping information carries a second routing rule identifier of a routing rule of a first filter corresponding to the IP flow;

determine, according to the first IP flow mapping information, first routing rule information comprising a first routing rule identifier of the routing rule of the first filter corresponding to the IP flow, wherein the first filter is comprised in a first PCC rule and wherein the first routing rule identifier of the first filter is allocated by a Policy and Charging Rules Function (PCRF), for the first filter comprised in the first PCC rule; and send the first routing rule information to the PCRF, so as to instruct the PCRF to process the first PCC rule according to the first routing rule information, wherein the instructions, when executed by the processor, are further configured to cause the processor to determine the first routing rule identifier according to the second routing rule identifier.

14. The apparatus according to claim 13, wherein when the first IP flow mapping information is used for requesting to modify an allowed access network type of the IP flow, the first IP flow mapping information further carries a requested access network type corresponding to the IP flow, wherein the first routing rule information further comprises the requested access network type.

15. The apparatus according to claim 13, wherein when the first IP flow mapping information is used for requesting to delete a second routing rule corresponding to the IP flow.

16. The apparatus according to claim 13, wherein when the first IP flow mapping information is used for requesting to modify the first filter corresponding to the IP flow, the first IP flow mapping information further carries a new filter corresponding to the IP flow, wherein the first routing rule information further comprises the new filter.

* * * * *